US012494987B2

(12) United States Patent
Xu et al.

(10) Patent No.: US 12,494,987 B2
(45) Date of Patent: Dec. 9, 2025

(54) PACKET FORWARDING METHOD, FORWARDING INDICATION INFORMATION ADVERTISING METHOD, ADVERTISEMENT PACKET ADVERTISING METHOD, AND DEVICE

(71) Applicant: HUAWEI TECHNOLOGIES CO., LTD., Shenzhen (CN)

(72) Inventors: Ling Xu, Beijing (CN); Bing Liu, Beijing (CN); Min Liu, Shenzhen (CN); Xia Chen, Beijing (CN); Yu Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 388 days.

(21) Appl. No.: 18/174,849

(22) Filed: Feb. 27, 2023

(65) Prior Publication Data
US 2023/0216775 A1 Jul. 6, 2023

Related U.S. Application Data

(63) Continuation of application No. PCT/CN2021/114161, filed on Aug. 23, 2021.

(30) Foreign Application Priority Data

Aug. 31, 2020 (CN) .......................... 202010898069.6

(51) Int. Cl.
H04L 45/12 (2022.01)
H04L 45/30 (2022.01)
H04L 45/52 (2022.01)

(52) U.S. Cl.
CPC .............. *H04L 45/12* (2013.01); *H04L 45/30* (2013.01); *H04L 45/52* (2013.01)

(58) Field of Classification Search
CPC ......... H04L 45/12; H04L 45/30; H04L 45/52; H04L 45/74; H04L 45/64; H04L 47/125;
(Continued)

(56) References Cited

U.S. PATENT DOCUMENTS 8,897,140 B1 * 11/2014 Bhattacharya ........ H04L 47/122
370/237
2003/0105865 A1 * 6/2003 McCanne ............... H04L 12/18
709/225

(Continued)

FOREIGN PATENT DOCUMENTS

CN 103997526 A 8/2014
CN 104980468 A 10/2015
(Continued)

OTHER PUBLICATIONS

Rekhter et al., "A Border Gateway Protocol 4 (BGP-4)", Network Working Group, The Internet Society, Jan. 2006, 104 pages.
(Continued)

Primary Examiner — Mohamed A Kamara
(74) Attorney, Agent, or Firm — Maier & Maier, PLLC

(57) ABSTRACT

A packet forwarding method. In this method, a forwarding node receives a packet, obtains a target service resource status advertised by each service node in a plurality of service nodes, selects a target service node from the plurality of service nodes based on the target service resource status advertised by the service node, and forwards the packet to the target service node. In other words, the forwarding node can sense a service resource status advertised by the service node, and the service resource status can indicate a resource usage status of a service resource managed by the service node. An actual processing capability of the service node can be sensed based on the resource usage status.

17 Claims, 8 Drawing Sheets

(58) Field of Classification Search
CPC ... H04L 47/24; H04L 47/822; H04L 45/0377; H04L 43/08; H04W 28/08
See application file for complete search history.

(56) References Cited

U.S. PATENT DOCUMENTS

| | | | | |
|---|---|---|---|---|
| 2012/0136984 | A1* | 5/2012 | Wang | H04L 67/1061 709/223 |
| 2013/0185717 | A1* | 7/2013 | Lakshminarayanan | G06F 9/45558 718/1 |
| 2014/0064099 | A1* | 3/2014 | Kuroda | H04L 61/5076 370/236 |
| 2018/0302343 | A1* | 10/2018 | Lokman | H04L 47/125 |
| 2021/0258249 | A1* | 8/2021 | Torvi | H04L 45/566 |

FOREIGN PATENT DOCUMENTS

| | | | |
|---|---|---|---|
| CN | 106657367 | A | 5/2017 |
| CN | 107979539 | A | 5/2018 |
| CN | 110858161 | A | 3/2020 |
| KR | 1020200026628 | A | 3/2020 |
| WO | 2019012546 | A1 | 1/2019 |

OTHER PUBLICATIONS

Bates et al., "Multiprotocol Extensions for BGP-4", Network Working Group, The IETF Trust, Jan. 2007, 12 pages.

* cited by examiner

PACKET FORWARDING METHOD, FORWARDING INDICATION INFORMATION ADVERTISING METHOD, ADVERTISEMENT PACKET ADVERTISING METHOD, AND DEVICE

CROSS-REFERENCE TO RELATED APPLICATIONS

This application is a continuation of International Application No. PCT/CN2021/114161, filed on Aug. 23, 2021, which claims priority to Chinese Patent Application No. 202010898069.6, filed on Aug. 31, 2020. The disclosures of the aforementioned applications are hereby incorporated by reference in their entireties.

TECHNICAL FIELD

The embodiments relate to the field of routing technologies, a packet forwarding method, a forwarding indication information advertising method, an advertisement packet advertising method, and a device.

BACKGROUND

Currently, to meet service requirements of enormous users, a plurality of service nodes may be deployed in a network for a same service. All the plurality of service nodes may provide the service. In this way, when receiving a data packet that is sent by a terminal device and that carries a service identifier, a forwarding node in the network may send the data packet to one of the plurality of service nodes. In this scenario, how to select, from the plurality of service nodes, a service node for processing the data packet affects processing efficiency of the data packet to some extent, and further affects quality of the service provided for a user.

In a related technology, when receiving a data packet, a forwarding node forwards the data packet to one of a plurality of service nodes in a proportional load balancing manner. However, in this packet forwarding manner, a selected service node may easily fail to meet a service quality requirement of a terminal device.

SUMMARY

The embodiments may provide a packet forwarding method, a forwarding indication information advertising method, an advertisement packet advertising method, and a device, to meet a service quality requirement of a terminal device.

According to a first aspect, a packet forwarding method is provided, and the method is applied to a network system. The network system includes a forwarding node and a plurality of service nodes. In the method, the forwarding node receives a packet from a terminal device, where the packet carries a target service identifier. Then, the forwarding node obtains a target service resource status advertised by each service node in the plurality of service nodes. The forwarding node selects a target service node from the plurality of service nodes based on the target service resource status advertised by the service node. The forwarding node forwards the packet to the target service node. The target service resource status indicates a resource usage status of a target service resource managed by the service node, and the target service resource is a resource that is in the network system and that can be used for processing a service indicated by the target service identifier.

In this embodiment, the forwarding node can sense a service resource status advertised by the service node, and the service resource status can indicate the resource usage status of the target service resource that is managed by the service node and that can be used for processing the service indicated by the target service identifier. An actual processing capability of the service node for processing the service indicated by the target service identifier is sensed based on the resource usage status. The forwarding node can sense the target service resource status of the service node. Therefore, when selecting the target service node, the forwarding node may consider the target service resource status of the service node, to avoid a case in which data pressure on a single service node is high. In this way, quality of a service provided by the service node for the terminal device can be improved.

It should be noted that, the method may also be applied to a service function chain technology. In the service function chain technology, if a controller specifies a forwarding path of a packet in a loose manner, the controller only specifies a sequence of service functions on a service function chain and does not specify a service function instance corresponding to a service function forwarder for implementing each service function. Therefore, when a service node or an ingress (which is equivalent to the foregoing forwarding node) in a service function chain domain that can implement a service function on a loose forwarding path receives a packet, a service node may be selected from the service nodes based on a service resource status advertised by each service node that manages a service function instance of a target service function on the loose forwarding path, to implement the target service function. Similarly, a case in which data pressure on a single service node is high can be avoided. In this way, the quality of the service provided by the service node for the terminal device can be improved. In this scenario, a target service in the method provided in this embodiment is a service function on the service function chain, the service node is the service function forwarder in the service function chain technology, and service resources managed by the service node are one or more service function instances managed by the service function forwarder.

According to the method provided in the first aspect, in a possible implementation, before the forwarding node receives the data packet from the terminal device, the forwarding node may further receive an advertisement packet sent by any service node in the network system, where the advertisement packet carries a service resource status of a service resource managed by the service node; and the forwarding node stores the service resource status of the service resource managed by the service node. In this scenario, that the forwarding node obtains a target service resource status advertised by each service node in the plurality of service nodes may be implemented by obtaining the target service resource status of the service node from the stored service resource status.

The forwarding node senses the service resource status of the service node based on the advertisement packet advertised by the service node, so that the method provided in this embodiment is implemented, and feasibility of the method is improved. Optionally, the target service resource status advertised by the service node may alternatively be obtained by the forwarding node from the controller. In this scenario, the service node advertises the service resource status to the controller, to improve flexibility of the method.

According to the method provided in the first aspect, in a possible implementation, the advertisement packet further carries a service resource identifier of each service resource in one or more service resources managed by the service node, the service resource status corresponds to each service resource identifier, and the service resource status corresponding to the service resource identifier indicates a resource usage status of a service resource that is indicated by the corresponding service resource identifier and that is managed by the service node. In this scenario, the obtaining the target service resource status of the service node from the stored service resource status may be implemented by obtaining, from the stored service resource status, a service resource status that is advertised by the service node and that corresponds to the target service resource, to obtain the target service resource status of the service node.

In this embodiment, the service resource status advertised by the service node may be a service resource status for each service resource. In this way, the forwarding node may select the target service node based on a service resource status of the service node in a current service. This further improves the quality of the service provided for the terminal device. Optionally, the service resource status advertised by the service node may alternatively be a unified service resource status for all service resources. This improves flexible application of the method.

According to the method provided in the first aspect, in a possible implementation, when the service node supports an open shortest path first (OSPF) protocol, the advertisement packet is an extended prefix type-length-value (TLV), and an address prefix of the extended prefix TLV carries the service resource identifier of the service resource managed by the service node, and an extended sub-TLV of the extended prefix TLV or a flag of the extended prefix TLV carries the service resource status of the service resource managed by the service node.

According to the method provided in the first aspect, in a possible implementation, when the service node supports an intermediate system to intermediate system (ISIS) protocol, the advertisement packet is an extended IP reachability type-length-value (TLV), a prefix of the extended IP reachability TLV carries the service resource identifier of the service resource managed by the service node, and a sub-TLV of the extended IP reachability TLV carries the service resource status of the service resource managed by the service node.

According to the method provided in the first aspect, in a possible implementation, when the service node supports a border gateway protocol (BGP), the advertisement packet is a BGP update message packet, network layer reachability information (NLRI) in the BGP update message packet carries the service resource identifier of the service resource managed by the service node, and a path attribute TLV in the BGP update message packet carries the service resource status of the service resource managed by the service node.

According to the method provided in the first aspect, in a possible implementation, the BGP includes a multiprotocol (MP) BGP and a non-MP BGP.

Existing fields in packets in different protocols are extended, so that the service node advertises the advertisement packet provided in this embodiment. This improves compatibility between the method and an existing protocol.

According to the method provided in the first aspect, in a possible implementation, before that the forwarding node selects a target service node from the plurality of service nodes based on the target service resource status advertised by the service node, the forwarding node may further determine a service node priority based on network performance of each service node, where network performance of a service node with a higher priority is better, and the network performance of the service node indicates network performance on a transmission path between the forwarding node and a corresponding service node. In this scenario, that the forwarding node selects a target service node from the plurality of service nodes based on the target service resource status advertised by the service node is implemented by determining the target service node based on the target service resource status of the service node and the service node priority.

When the target service node is selected, both the service resource status of the service node and the network performance on the transmission path between the forwarding node and the service node are considered, to further improve the quality of the service provided for the terminal device.

According to the method provided in the first aspect, in a possible implementation, the service resource status includes a light load state and an overload state, the overload state indicates that resource usage of a target service resource managed by the corresponding service node exceeds a first usage threshold, and the light load state indicates that resource usage of a target resource managed by the corresponding service node is less than a second usage threshold.

In this scenario, the foregoing target service node is a service node with a highest priority among service nodes whose service resource statuses are the light load state in the plurality of service nodes.

To improve convenience of the method provided in this embodiment, the service resource status may be classified into the light load state and the overload state. In this way, efficiency of selecting the target service node can be improved.

According to the method provided in the first aspect, in a possible implementation, the network performance of the service node includes one or more of a transmission delay on the transmission path between the forwarding node and the corresponding service node, a total metric of the transmission path between the forwarding node and the corresponding service node, and a remaining bandwidth of the transmission path between the forwarding node and the corresponding service node.

Any one of the foregoing manners can represent the network performance of the service node. This improves flexibility of the method provided in this embodiment.

According to the method provided in the first aspect, in a possible implementation, the forwarding node is a gateway (GW), and the plurality of service nodes are a plurality of servers communicating with the GW.

According to the method provided in the first aspect, in a possible implementation, the forwarding node is a gateway GW, the plurality of service nodes are a plurality of server cluster master nodes communicating with the GW, each of the plurality of server cluster master nodes is connected to the GW via a data center gateway (DCGW), and two of the plurality of server cluster master nodes are located in different data centers.

In this embodiment, the service node may be the server connected to the GW or may be the server cluster master node connected to the GW via the DCGW. This improves the flexibility of the method. In addition, the service node may be located in different data centers (where the data center may also be referred to as a cloud). In other words, the forwarding node can sense service resource statuses advertised by the service nodes in different clouds. This expands an application scenario of the method.

According to the method provided in the first aspect, in a possible implementation, the target service identifier is an anycast IP address or a service name.

The method provided in this embodiment may be applied to an anycast scenario or may be applied to another scenario in which a service needs to be provided for the terminal device. This improves the flexibility of the method.

According to the method provided in the first aspect, in a possible implementation, the forwarding node may be an ingress node or a service function forwarder (SFF) in a service function chain (SFC) domain and the plurality of service nodes may be service function (SF) instances managed by a plurality of SFFs.

The method provided in this embodiment may be further applied to a service function chain technology. This further improves the flexibility of the method.

According to a second aspect, a forwarding indication information advertising method is provided. The method is applied to a controller in a network system, and the network system further includes a forwarding node and a plurality of service nodes. In the method, the controller obtains a service resource status advertised by each service node in the plurality of service nodes, where the service resource status indicates a resource usage status of a service resource managed by an advertiser. The controller advertises packet forwarding indication information to the forwarding node based on the service resource status advertised by the service node, where the forwarding indication information indicates, to the forwarding node, how to select a target service node from the plurality of service nodes to forward a packet.

The foregoing packet forwarding indication information may be information related to a forwarding path, or may be the service resource status, so that the target service node selected by the forwarding node is determined based on the service resource status advertised by the service node.

According to the method provided in the second aspect, in a possible implementation, any service node in the plurality of service nodes manages one or more service resources, and each service resource in the one or more service resources is for implementing a service function on a service function chain. In this scenario, the packet forwarding indication information is a forwarding path for the service function chain, and the forwarding path indicates a service resource of a service node on which a data packet is processed.

The method provided in this embodiment may be applied to a service function chain technology. In the service function chain technology, the controller specifies a forwarding path of a packet in a strict manner. In this case, for any service function on the service function chain, the controller may select, from the service nodes based on a service resource status of a service function instance of the service function managed by each service node, a service function instance managed by a service node to implement the service function, to determine a strict forwarding path for the service function chain. The strict forwarding path specifies a service function instance of a service node for processing a packet. The service function instance herein is equivalent to the service resource managed by the service node, and the service node may be a service function forwarder in the service function chain technology. In this way, a problem that data processing pressure on a single service node is high can be avoided, to improve quality of a service provided by the service node for a terminal device.

According to a third aspect, an advertisement packet advertising method is provided, where the method is applied to any one of a plurality of service nodes included in a network system, and the network system further includes a forwarding node or a controller. In the method, the service node advertises an advertisement packet to the forwarding node or the controller, where the advertisement packet carries a service resource status of a service resource managed by the service node, and the service resource status indicates a resource usage status of the service resource managed by an advertiser.

The advertisement packet indicates the forwarding node to select, based on the service resource status advertised by each service node in the plurality of service nodes, a target service node from the plurality of service nodes to forward a packet; or the advertisement packet indicates the controller to advertise packet forwarding indication information to the forwarding node based on the service resource status advertised by each service node, where the forwarding indication information indicates, to the forwarding node, how to select a target service node from the plurality of service nodes to forward a packet.

According to the method provided in the third aspect, in a possible implementation, the advertisement packet further carries a service resource identifier of each service resource in one or more service resources managed by the service node, the service resource status of the service node corresponds to each service resource identifier, and the service resource status corresponding to the service resource identifier indicates a resource usage status of a service resource that is indicated by the corresponding service resource identifier and that is managed by the service node.

According to the method provided in the third aspect, in a possible implementation, when the service node supports an open shortest path first (OSPF) protocol, the advertisement packet is an extended prefix type-length-value (TLV), and an address prefix of the extended prefix TLV carries the service resource identifier of the service resource managed by the service node, and an extended sub-TLV of the extended prefix TLV or a flag of the extended prefix TLV carries the service resource status of the service resource managed by the service node.

According to the method provided in the third aspect, in a possible implementation, when the service node supports an intermediate system to intermediate system (ISIS) protocol, the advertisement packet is an extended IP reachability type-length-value (TLV), a prefix of the extended IP reachability TLV carries the service resource identifier of the service resource managed by the service node, and a sub-TLV of the extended IP reachability TLV carries the service resource status of the service resource managed by the service node.

According to the method provided in the third aspect, in a possible implementation, when the service node supports a border gateway protocol (BGP), the advertisement packet is a BGP update message packet, network layer reachability information (NLRI) in the BGP update message packet carries the service resource identifier of the service resource managed by the service node, and a path attribute TLV in the BGP update message packet carries the service resource status of the service resource managed by the service node.

According to the method provided in the third aspect, in a possible implementation, the BGP includes a multiprotocol (MP) BGP and a non-MP BGP.

According to the method provided in the third aspect, in a possible implementation, in the method, the service node determines a service resource status at a current time point. If the service resource status at the current time point is different from a service resource status prior to the current time point, the service node performs an advertisement packet advertising operation.

In this embodiment, the advertisement packet may be advertised only when the service resource status changes. This saves network resources.

According to the method provided in the third aspect, in a possible implementation, the service resource status includes a light load state and an overload state, the overload state indicates that resource usage of a service resource managed by a corresponding service node exceeds a first usage threshold, and the light load state indicates that resource usage of a service resource managed by a corresponding service node is less than a second usage threshold.

According to the method provided in the third aspect, in a possible implementation, a service identifier is an anycast IP address or a service name.

According to the method provided in the third aspect, in a possible implementation, the forwarding node may be a gateway (GW) and the plurality of service nodes may be a plurality of servers communicating with the GW.

According to the method provided in the third aspect, in a possible implementation, the forwarding node may be a gateway (GW), the plurality of service nodes may be a plurality of server cluster master nodes communicating with the GW, each of the plurality of server cluster master nodes may be connected to the GW via a data center gateway (DCGW), and two of the plurality of server cluster master nodes may be located in different data centers.

According to the method provided in the third aspect, in a possible implementation, the forwarding node may be an ingress node or a service function forwarder (SFF) in a service function chain (SFC) domain, and the plurality of service nodes may be service function (SF) instances managed by a plurality of SFFs.

For effects related to other content in the third aspect, refer to effects in the first aspect and the second aspect. Details are not described herein again.

According to a fourth aspect, a forwarding node is provided. The forwarding node has a function of implementing behavior of the packet forwarding method in the first aspect. The forwarding node includes at least one module, and the at least one module is configured to implement the packet forwarding method provided in the first aspect.

According to a fifth aspect, a controller is provided. The controller has a function of implementing behavior of the forwarding path determining method in the second aspect. The controller includes at least one module, and the at least one module is configured to implement the forwarding path determining method provided in the second aspect.

According to a sixth aspect, a service node is provided. The service node has a function of implementing behavior of the advertisement packet advertising method in the third aspect. The service node includes at least one module, and the at least one module is configured to implement the advertisement packet advertising method provided in the third aspect.

According to a seventh aspect, a network device is provided. A structure of the network device includes a processor and a memory. The memory is configured to store a program that supports the network device in performing the method provided in the first aspect, the second aspect, or the third aspect, and store data for implementing the method provided in the first aspect, the second aspect, or the third aspect. The processor is configured to execute the program stored in the memory. An operation apparatus of the storage device may further include a communication bus, and the communication bus is configured to establish a connection between the processor and the memory.

According to an eighth aspect, a non-transitory computer-readable storage medium is provided. The non-transitory computer-readable storage medium stores instructions. When the instructions are run on a computer, the computer performs the method according to the first aspect, the second aspect, or the third aspect.

According to a ninth aspect, a computer program product including instructions is provided. When the instructions are run on a computer, the computer performs the method according to the first aspect, the second aspect, or the third aspect.

According to a tenth aspect, a network system is provided. The network system includes a forwarding node and a plurality of service nodes.

Any service node in the plurality of service nodes is configured to advertise an advertisement packet to the forwarding node, where the advertisement packet carries a service resource status of a service resource managed by the service node, and the service resource status indicates a resource usage status of the service resource managed by the service node.

The forwarding node is configured to: receive a packet from a terminal device, where the packet carries a target service identifier; obtain a target service resource status advertised by each service node in the plurality of service nodes, where the target service resource status indicates a resource usage status of a target service resource managed by the service node; select a target service node from the plurality of service nodes based on the target service resource status advertised by the service node; and forward the packet to the target service node.

According to an eleventh aspect, a network system is provided. The network system includes a controller, a forwarding node, and a plurality of service nodes.

Any service node in the plurality of service nodes is configured to advertise an advertisement packet to the controller, where the advertisement packet carries a service resource status of a service resource managed by the service node, and the service resource status indicates a resource usage status of the service resource managed by an advertiser.

The controller is configured to advertise packet forwarding indication information to the forwarding node based on the service resource status advertised by the service node, where the forwarding indication information indicates, to the forwarding node, how to select a target service node from the plurality of service nodes to forward a packet.

For effects obtained in the fourth aspect to the eleventh aspect, refer to effects obtained by using the first aspect, the second aspect, or the third aspect. Details are not described herein again.

DETAILED DESCRIPTION OF THE EMBODIMENTS

To make the objectives, solutions, and advantages of the embodiments clearer, the following further describes the embodiments in detail with reference to the accompanying drawings.

Before the embodiments are explained and described in detail, an application scenario is first explained and described.

At present, massive data transmission, analysis, and storage brought by an increasing quantity of terminal devices pose a great challenge to a conventional network. Various service applications may be installed on the terminal device. The terminal device requests, through the service application, a service node to provide a service. Because resources of a single scattered service node are limited, it is difficult to ensure quality of the service provided by the service node for the terminal device. Therefore, service nodes of different scales need to be deployed at different locations close to the terminal device. These service nodes can provide a same service, to meet requirements of a large quantity of terminal devices for a service. In addition, a same service node can provide a plurality of different services, to provide various personalized services for the terminal device through a global network. As a cloud and edge computing trend develops, the service node may be flexibly deployed on each mobile edge computing (MEC) device and a central cloud that have a computing capability, to provide various services for the terminal device.

A packet forwarding method provided in the embodiments is applied to the foregoing scenario in which a plurality of service nodes may be deployed for a same service. In this case, how to select, from the plurality of service nodes, a service node for processing a data packet affects processing efficiency of the data packet to some extent, and further affects the quality of the service provided for the terminal device.

Figure 1:
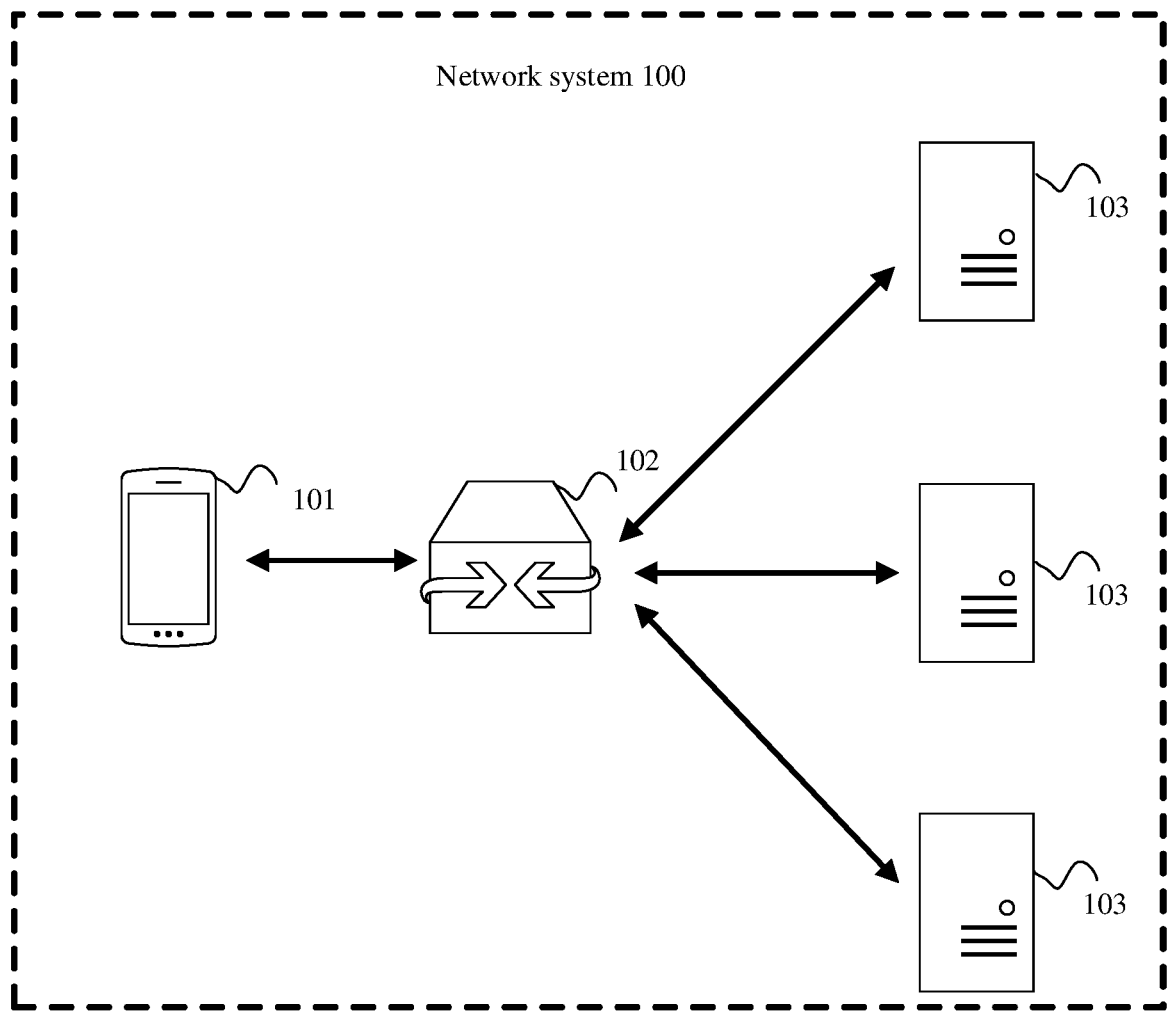
FIG. 1 is a schematic diagram of a structure of a network system according to an embodiment.

FIG. 1 is a schematic diagram of a structure of a network system according to an embodiment. As shown in FIG. 1, the network system 100 includes a terminal device 101, a forwarding node 102, and service nodes 103. The terminal device 101 and the forwarding node 102 communicate with each other in a wireless or wired manner. The forwarding node 102 and the service nodes 103 are connected in a wired or wireless manner to perform communication.

During implementation, the terminal device 101 is a user-side device. Various service applications are installed on the terminal device 101. The terminal device may send, to the forwarding node 102, a service request triggered by any service application. When receiving the service request, the forwarding node 102 determines, based on a service identifier carried in the service request, all service nodes 103 that can provide a service indicated by the service identifier in the network, to obtain a plurality of service nodes 103, where the plurality of service nodes 103 may be servers corresponding to the service application. Then, the forwarding node 102 selects a service node from the plurality of service nodes 103 as a target service node based on service resource statuses advertised by the plurality of service nodes and forwards the service request to the target service node. After receiving the service request, the target service node processes the service request, so that the target service node provides the service for the terminal device. The service resource status will be described and explained in detail in the following and is not described herein.

Figure 2:
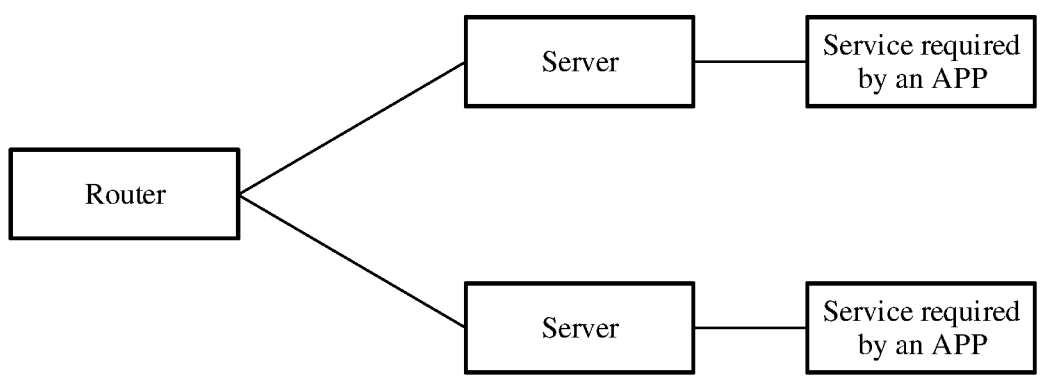
FIG. 2 is a schematic diagram of a server scenario according to an embodiment.
Figure 3:
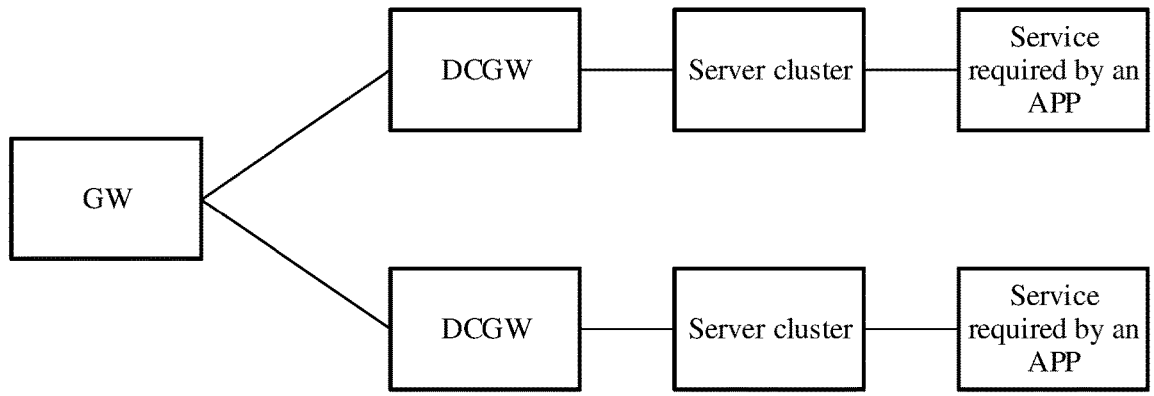
FIG. 3 is a schematic diagram of a server cluster scenario according to an embodiment.

The foregoing implementation may be applied to a server scenario shown in FIG. 2 or a server cluster scenario shown in FIG. 3. In the scenario shown in FIG. 2, a gateway such as a router is equivalent to the forwarding node 102, and each server is equivalent to the service node 103. The server is configured to provide a service that is required by an application (APP) installed on a terminal device, and the service required by the APP in FIG. 2 is equivalent to a service resource managed by the server. In the foregoing implementation, a router 102 can select a server 103 from servers 103 to process a service request, so that the selected server 103 processes the service for the terminal device.

In the scenario shown in FIG. 3, a gateway (GW) is equivalent to the forwarding node 102, and a server cluster master node connected to each data center gateway (DCGW) is equivalent to the service node 103. Each server in a server cluster can provide a service required by an APP, and the server cluster master node uniformly provides a communication interface for the outside. The service required by the APP in FIG. 3 is equivalent to a service resource managed by the server in the server cluster, and the server cluster master node advertises, to the GW via the DCGW, a service resource status of the service resource managed by the server in the server cluster. In the foregoing implementation, a GW 102 can select, from DCGWs 103, a DCGW 103 to which a server cluster master node is connected for processing a service request, so that a server in a server cluster connected to the selected DCGW 103 processes the service. The application scenario shown in FIG. 3 may also be referred to as a mobile edge computing scenario.

In another implementation, the network system shown in FIG. 1 may alternatively be applied to a service function chain (SFC) technology. For ease of subsequent description, the SFC technology is first briefly described herein. The SFC technology is a technology that provides an ordered service function (SF) for an application layer, and the service function is also referred to as a service. SFs on a network device are logically connected to form an ordered SF combination. The ordered SF combination is a service function chain. Service function chain information is added to an original data packet, so that the packet passes through devices that provide SFs in sequence along a path specified by the service function chain.

The service function chain includes a plurality of ordered SFs, including a firewall (FW), a load balancer (LB), an intrusion prevention system (IPS), and deep packet inspection. Each SF may be implemented by one or more service function forwarders (SFFs) in a network, and the SFF may be a network forwarding device such as a router or a switch. In addition, one SFF may support one or more same or different SFs.

To avoid confusion between an SF supported by an SFF and a service function implemented by an SF supported by an SFF, the SF supported by the SFF is referred to as an SF instance. In addition, one or more SF instances supported by one SFF may be further explained as: one or more SF instances corresponding to one SFF, or one or more SF instances managed by one SFF.

It should be noted that, in a current SFC technology, a forwarding path of a data packet may be obtained through calculation by a controller. The forwarding path may also be referred to as a service function path (SFP). This scheduling manner is referred to as a centralized scheduling manner. In the centralized scheduling manner, the controller obtains the forwarding path of the data packet through calculation in two manners: a strict manner and a loose manner.

Figure 4:
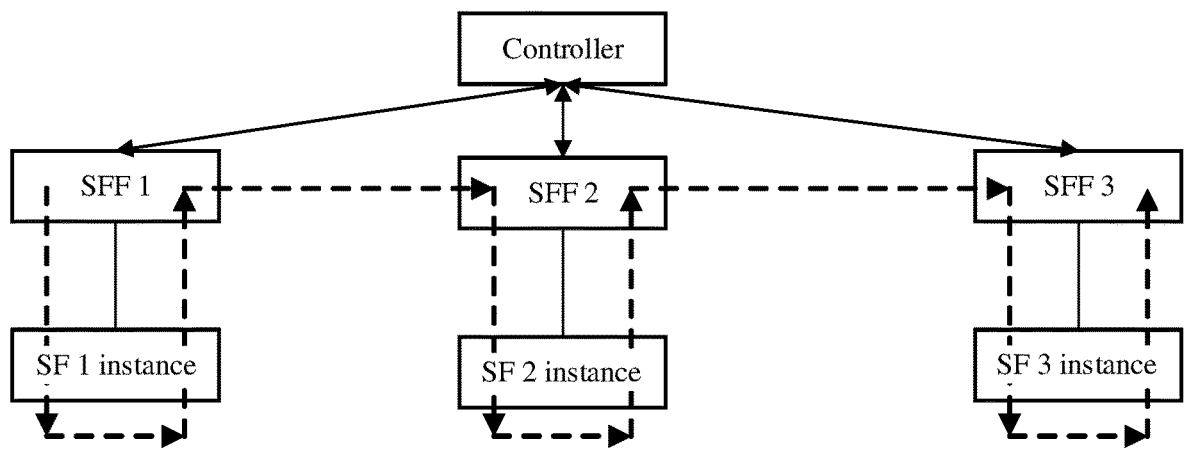
FIG. 4 is a schematic diagram of a scenario of a strict forwarding path in a service function chain according to an embodiment.

The strict manner means that the controller determines a SF instance corresponding to a SFF for processing the data packet. FIG. 4 is a schematic diagram of a strict forwarding path according to an embodiment. As shown in FIG. 4, it is specified by a controller that, on the strict forwarding path, an SF 1 instance corresponding to SFF 1 first processes a data packet, then an SF 2 instance corresponding to SFF 2 continues to process the data packet, and finally an SF 3 instance corresponding to SFF 3 processes the data packet. In this case, the strict forwarding path is: SFF 1→SF 1 instance→SFF 1→SFF 2→SF 2 instance→SFF 2→SFF 3→F 3 instance→SFF 3.

When the method provided in the embodiments is applied to the foregoing strict forwarding path scenario, each SFF is equivalent to the service node in FIG. 1, and an SF instance corresponding to the SFF is a service resource managed by the SFF. The SFF may advertise a service resource status of the corresponding SF instance to the controller, so that the controller determines the strict forwarding path based on the service resource status of the SF instance corresponding to the SFF.

Figure 5:
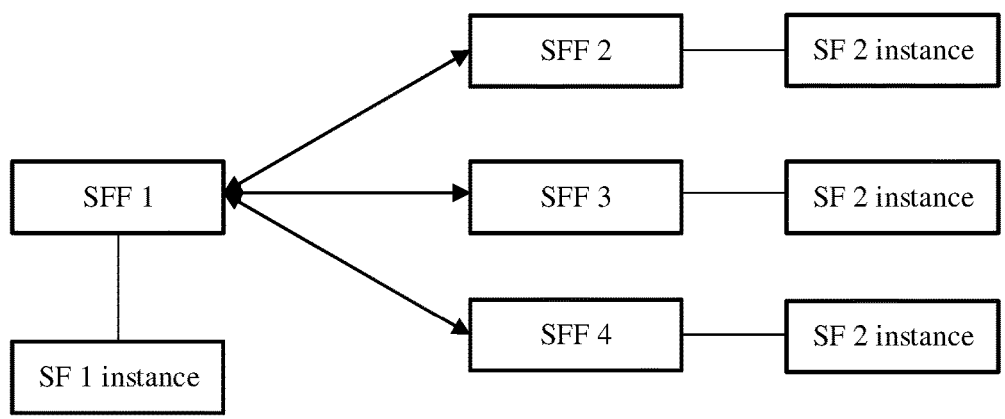
FIG. 5 is a schematic diagram of a scenario of a loose forwarding path in a service function chain according to an embodiment.

The loose manner means that a controller does not specify a SF instance corresponding to a SFF for processing a data packet, and only needs to specify a plurality of ordered SFs on a forwarding path of the data packet. An underlying SFF selects the SF instance corresponding to the SFF for processing the data packet. FIG. 5 is a schematic diagram of a loose forwarding path according to an embodiment. As shown in FIG. 5, it is assumed that the loose forwarding path delivered by a controller is SF 1-SF 2. If a data packet has been processed by an SF 1 instance corresponding to SFF 1 (where how to determine that the SF 1 instance corresponding to SFF 1 processes the data packet is not described herein), SFF 1 needs to forward the data packet to a next SFF, so that SF 2 processes the data packet. As shown in FIG. 5, currently, there are three SF 2 instances corresponding to SF 2, and the three instances are respectively deployed on three SFFs: SFF 2, SFF 3, and SFF 4. In this case, SFF 1 may select one SFF from the three SFFs for forwarding the data packet, so that an SF 2 instance corresponding to the selected SFF processes the data packet.

When the method provided in embodiments is applied to the foregoing loose scheduling scenario, the terminal device 101 in FIG. 1 is still the user-side device, and the terminal device is configured to send the data packet. The forwarding node 102 may be an SFF that manages an SF instance of a service function on the loose forwarding path or may be an ingress node in an SFC domain, for example, a service classifier. The service nodes 103 are a plurality of SFFs that manage target SF instances, and the target SF instance is an SF instance of a next to-be-implemented service function on the loose forwarding path. In this case, when receiving a data packet, the forwarding node 102 may determine, based on a service resource status that is of each SF instance corresponding to each SFF 103 and that is advertised by each SFF 103, a service resource status that is of the target SF instance and that is advertised by the SFF 103, to obtain a target service resource status advertised by the SFF 103. In this way, the forwarding node 102 can select one SFF 103 from the plurality of SFFs 103 to continue processing the data packet. In other words, the forwarding node 102 selects one service node from the plurality of service nodes 103 to continue processing the data packet.

It should be noted that the network shown in FIG. 1 may include a plurality of forwarding nodes 102. In FIG. 1, only one forwarding node 102 is used as an example for description. In addition, the service nodes 103 connected to the forwarding node 102 in the network shown in FIG. 1 may include a plurality of service nodes 103. In FIG. 1, only three service nodes are used as an example for description. In the embodiments, a quantity of forwarding nodes included in a network and a quantity of service nodes connected to each forwarding node are not limited.

In addition, the terminal device 101 in FIG. 1 may be a device such as a mobile phone, a tablet computer, or a desktop computer. The forwarding node 102 may be a device that has a forwarding function, such as a router, a switch, or a gateway. The service node may be a device such as a computer or a server.

It should be noted that the forwarding node shown in FIG. 1 is a forwarding node close to a user side. In other words, the forwarding node is an ingress node in the network for a data packet sent by a terminal device.

In addition, another forwarding node (which is not shown in FIG. 1) may be deployed between the forwarding node 102 and the service node 103 in FIG. 1. In this scenario, after determining a target service node, the forwarding node 102 forwards a data packet to the another forwarding node, and the another forwarding node forwards the data packet to the target service node.

In the network system shown in FIG. 1, because a current service network is completely decoupled from an underlying network that bears a service, the underlying network that bears the service can select, only according to a proximity principle or a load balancing principle, a target service node for forwarding a packet. However, if the forwarding node selects the target service node according to the proximity principle or the load balancing principle, a case in which a large quantity of data packets are forwarded to a same service node easily occurs. Consequently, data processing pressure on a single service node is high. To avoid this case, in the embodiments, the forwarding node can sense a service resource status of a service node, the service resource status can indicate a resource usage status of a service resource managed by the service node, and the service resource is a resource that can be used for processing a service. An actual processing capability of the service node can be sensed based on the resource usage status. For example, when a service resource status indicates that resource usage of service resources of a service node is high, it indicates that a capability of processing more data packets by the service node currently is weak. When a service resource status indicates that resource usage of service resources of a service node is low, it indicates that a capability of processing more data packets by the service node currently is strong. The forwarding node can sense the service resource status of the service node. Therefore, when selecting the target service node, the forwarding node may consider the service resource status of the service node, to avoid a case in which data pressure on a single service node is high. In this way, the packet forwarding method provided in the embodiments may be applied to a scenario in which a service network and an underlying network that bears a service are converged, to implement reducing the data processing pressure on the service node in the service network through forwarding a packet by a forwarding node in a bearer network.

Based on the foregoing content, it can be understood that the embodiments include two sections. In one section, how a forwarding node senses a service resource status advertised by a service node is described. In the other section, how a forwarding node selects a target service node based on a service resource status advertised by each service node is described. The following two embodiments are respectively used to explain and describe the foregoing two sections.

Figure 6:
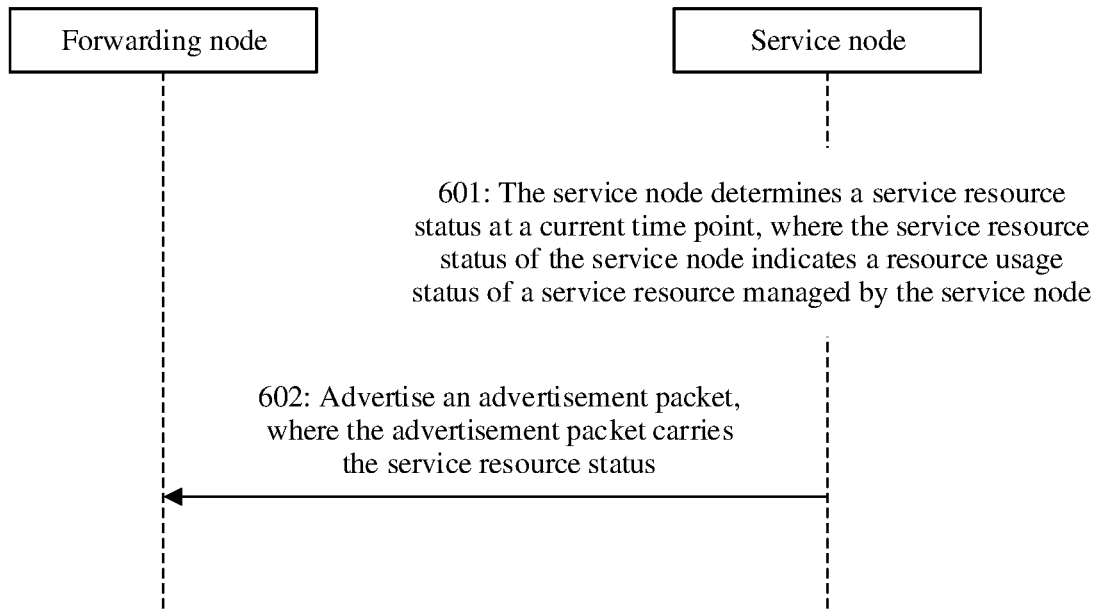
FIG. 6 is a flowchart of a method for advertising a service resource status by a service node according to an embodiment.

FIG. 6 is a flowchart of a method for advertising a service resource status by a service node according to an embodiment. The method is applied to any service node in the network system shown in FIG. 1. As shown in FIG. 6, the method includes the following steps.

Step 601: A service node determines a service resource status at a current time point, where the service resource status of the service node indicates a resource usage status of a service resource managed by the service node.

In this embodiment, to enable a forwarding node to consider a current service resource status of each service node when forwarding a data packet, the service node may detect the service resource status at the current time point in real time, to advertise the service resource status of the service node in the following step 602.

In an implementation, the service node may periodically determine the service resource status at the current time point. A periodicity in which the service node determines the service resource status may be randomly set. This is not limited in this embodiment.

In addition, in an implementation, the service resource status in this embodiment includes an overload state and a light load state. The overload state means that current resource usage of the service resource managed by the service node exceeds a first usage threshold. In this case, it indicates that a current to-be-processed service is beyond an actual processing capability of the service node. The light load state means that current resource usage of the service resource managed by the service node is less than a second usage threshold. In this case, it indicates that a to-be-processed service is not beyond an actual processing capability of the service node.

The resource usage may be represented by using a quantity of to-be-processed data packets. In this case, the first usage threshold and the second usage threshold may be represented by using quantity thresholds. In this scenario, an implementation of determining the service resource status may be as follows. The service node determines a quantity of to-be-processed data packets corresponding to the service resource managed by the service node. If the quantity of to-be-processed data packets exceeds a first quantity threshold, the service node determines that the service resource status at the current time point is the overload state. If the quantity of to-be-processed data packets is less than a second quantity threshold, the service node determines that the service resource status at the current time point is the light load state.

In addition, the service resource status may be a unified service resource status of all service resources managed by the service node. In this scenario, the quantity of to-be-processed data packets corresponding to the service resources managed by the service node includes a quantity of to-be-processed data packets corresponding to all the service resources managed by the service node.

Optionally, the service resource status may alternatively be a service resource status of a service resource on the service node. In this scenario, the quantity of to-be-processed data packets corresponding to the service resource managed by the service node includes a quantity of to-be-processed data packets corresponding to each service resource. In other words, the service resource status of the service node includes a service resource status corresponding to each service resource managed by the service node.

In addition, the service node may alternatively represent the resource usage status based on another factor. An implementation of the resource usage status is not limited in this embodiment. For example, the resource usage status may be represented based on an available memory capacity of the service node. In this case, the resource usage is represented by using the available memory capacity, and the first usage threshold and the second usage threshold are represented by using capacity thresholds. If the available memory capacity exceeds a first capacity threshold, the service node determines that the service resource status at the current time point is the light load state. If the available memory capacity is less than a second capacity threshold, the service node determines that the service resource status at the current time point is the overload state.

The first usage threshold may be the same as or different from the second usage threshold. This is not limited in this embodiment.

In addition, the service resource status provided in this embodiment may alternatively be directly reflected by using resource usage of the service resource managed by the service node. In this case, determining the resource usage is equivalent to determining the service resource status. For example, for a service node, if it is determined that resource usage of a service resource managed by the service node is 50%, it is determined that a service resource status is 50%. In this implementation, the service node does not need to determine a status of a coarser granularity based on the resource usage, but directly uses a value of the determined resource usage as the service resource status.

Step 602: The service node advertises an advertisement packet, where the advertisement packet carries the service resource status of the service resource managed by the service node.

In an implementation, after determining the service resource status in step 601, the service node may send the advertisement packet to the forwarding node, to advertise the advertisement packet. After determining the service resource status at the current time point, the service node may advertise the service advertisement packet without performing another operation. This improves convenience of advertising the advertisement packet.

In another implementation, the service node may advertise the advertisement packet only when the service resource status changes. After determining the service resource status at the current time point in step 601, the service node further needs to determine whether the service resource status at the current time point is different from a service resource status prior to the current time point. If the service resource status at the current time point is different from the service resource status prior to the current time point, the service node triggers advertisement packet advertising. If the service resource status at the current time point is the same as the service resource status prior to the current time point, the service node does not trigger advertisement packet advertising. A quantity of times that the service node advertises the advertisement packet can be reduced to reduce network resource usage.

For example, when the service resource status includes the light load state and the overload state, if the service processing resource status determined at the current time point is one of the light load state and the overload state, but the service resource status determined prior to the current time point is the other of the light load state and the overload state, advertisement packet advertising may be triggered. If the service resource status determined prior to the current time point and the service resource status determined at the current time point are the same, advertisement packet advertising is not triggered.

It should be noted that, when the service resource status of the service node includes the service resource status corresponding to each service resource managed by the service node, that the service resource status at the current time point is different from the service resource status prior to the current time point may mean that a service resource status of any service resource at the current time point is different from the service resource status prior to the current time point. In this case, in addition to carrying a service resource status of a service resource whose service resource status changes at the current time point, the advertised advertisement packet may further carry a service resource status of another service resource whose service resource status does not change, or may not carry a service resource status of another service resource whose service resource status does not change.

In addition, when advertising the advertisement packet carrying the service resource status, the service node may further include, in the advertisement packet, a service resource identifier of each of one or more service resources managed by the service node. Optionally, the service resource status of the service node and the service resource identifier of the service resource managed by the service node may alternatively be advertised in different types of advertisement packets. This is not limited in this embodiment.

In addition, when the service resource status provided in this embodiment is a service resource status for a service resource, the service resource identifier carried in the advertisement packet is in one-to-one correspondence with the service resource status. The advertisement packet may carry a service resource identifier of each of one or more service resources managed by any service node and the service resource status may correspond to each service resource identifier. That the service resource status corresponds to each service resource identifier herein means that each service resource identifier corresponds to one service resource status, and the service resource status corresponding to the service identifier indicates a resource usage status of a service resource that is indicated by the corresponding service resource identifier and that is managed by the service node.

Optionally, when the service resource status provided in this embodiment is the unified service resource status for all the service resources managed by the service node, all service resource identifiers carried in the advertisement packet correspond to a same service resource status. Details are not described herein.

In this embodiment, an existing protocol may be extended, so that the service node can advertise the advertisement packet and the advertisement packet carries both the service resource status of the service node and the service resource identifier of the service resource managed by the service node. It should be noted that the following several examples are described by using an example in which the advertisement packet carries both the service resource status of the service node and the service resource identifier of the service resource managed by the service node. As described in the foregoing content, the service resource identifier and the service resource status carried in the advertisement packet may or may not be in one-to-one correspondence. This is not limited in the following examples.

For example, if a service node supports an open shortest path first (OSPF) protocol, the foregoing advertisement packet is an extended prefix type-length-value (TLV). An address prefix in the extended prefix TLV carries a service resource identifier of a service resource managed by the service node. An extended sub-TLV in the extended prefix TLV or a flag in the extended prefix TLV carries a service resource status of the service resource managed by the service node.

Figure 7:
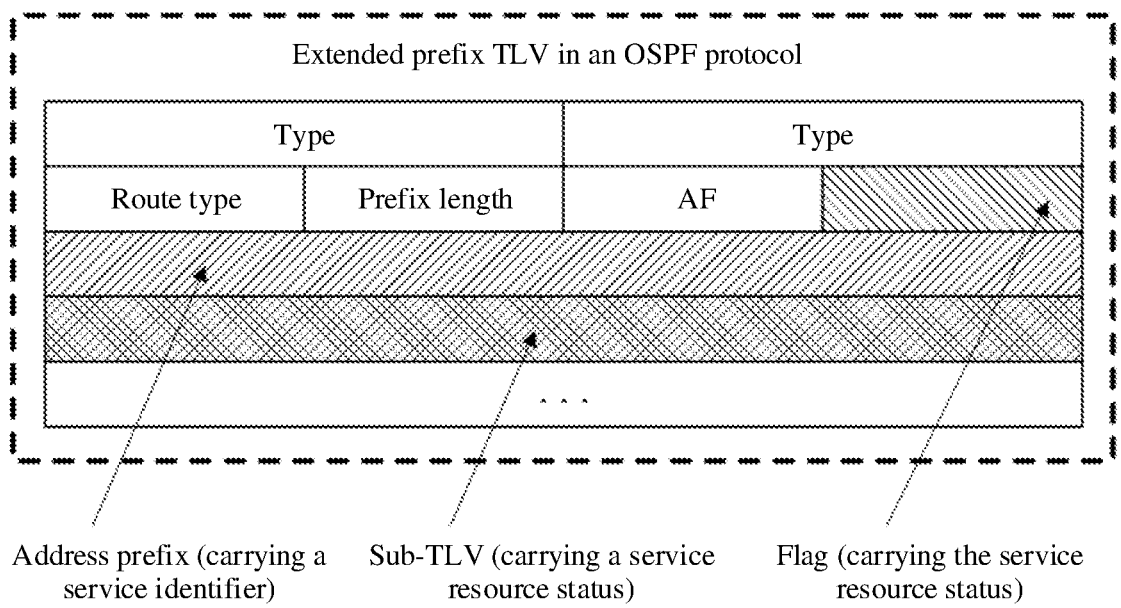
FIG. 7 is a schematic diagram of a format of an extended prefix TLV in an OSPF protocol according to an embodiment.

FIG. 7 is a schematic diagram of a format of an extended prefix TLV in an OSPF protocol according to an embodiment. As shown in FIG. 7, the extended prefix TLV includes a type field, a length field, a route type field, a prefix length field, a flag field, an address prefix field, a sub-TLV, and the like.

In the extended prefix TLV shown in FIG. 7, some fields may be obtained by extending the address prefix field, to carry a service resource identifier of a service resource managed by a service node. Some fields are obtained by extending the flag field, to carry a service resource status of the service resource managed by the service node; or one sub-TLV is obtained through extension, to carry a service resource status of the service resource managed by the service node.

The foregoing is only a possible extension manner of the extended prefix TLV. An extension manner of the extended prefix TLV is not limited in this embodiment, provided that an extended prefix TLV obtained through extension can carry the service resource identifier of the service resource managed by the service node and the service resource status of the service resource managed by the service node. For example, optionally, two sub-TLVs may be obtained through extension in the extended prefix TLV to respectively carry the service resource identifier of the service resource managed by the service node and the service resource status of the service resource managed by the service node.

For example, if a service node supports an intermediate system to intermediate system (ISIS) protocol, the foregoing advertisement packet is an extended IP reachability type-length-value (TLV). A prefix in the extended IP reachability TLV carries a service resource identifier of a service resource managed by the service node. A sub-TLV in the extended IP reachability TLV carries a service resource status of the service resource managed by the service node.

Figure 8:
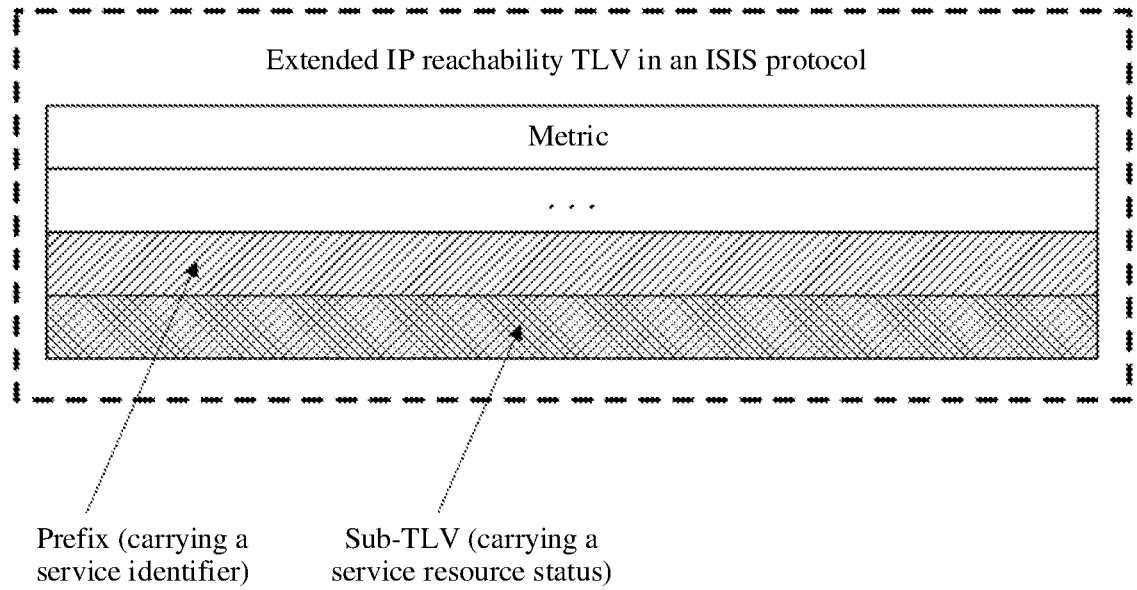
FIG. 8 is a schematic diagram of a format of an extended IP reachability TLV in an ISIS protocol according to an embodiment.

FIG. 8 is a schematic diagram of a format of an extended IP reachability TLV in an ISIS protocol according to an embodiment. The extended IP reachability TLV is an extended IP reachability TLV whose type is 135. As shown in FIG. 8, the extended IP reachability TLV includes a metric field, a prefix field, a sub-TLV field, and the like.

The foregoing is only a possible extension manner of the extended IP reachability TLV. An extension manner of the extended IP reachability TLV is not limited in this embodiment, provided that an extended IP reachability TLV obtained through extension can carry a service resource identifier of a service resource managed by a service node and a service resource status of the service resource managed by the service node. For example, optionally, two sub-TLVs may be obtained through extension in the extended IP reachability TLV to respectively carry the service resource identifier of the service resource managed by the service node and the service resource status of the service resource managed by the service node.

For another example, if a service node supports a border gateway protocol (BGP), the foregoing advertisement packet is a BGP update message packet. Network layer reachability information (NLRI) in the BGP update message packet carries a service resource identifier of a service resource managed by the service node. A path attribute TLV in the BGP update message packet carries a service resource status of the service resource managed by any service node.

Figure 9:
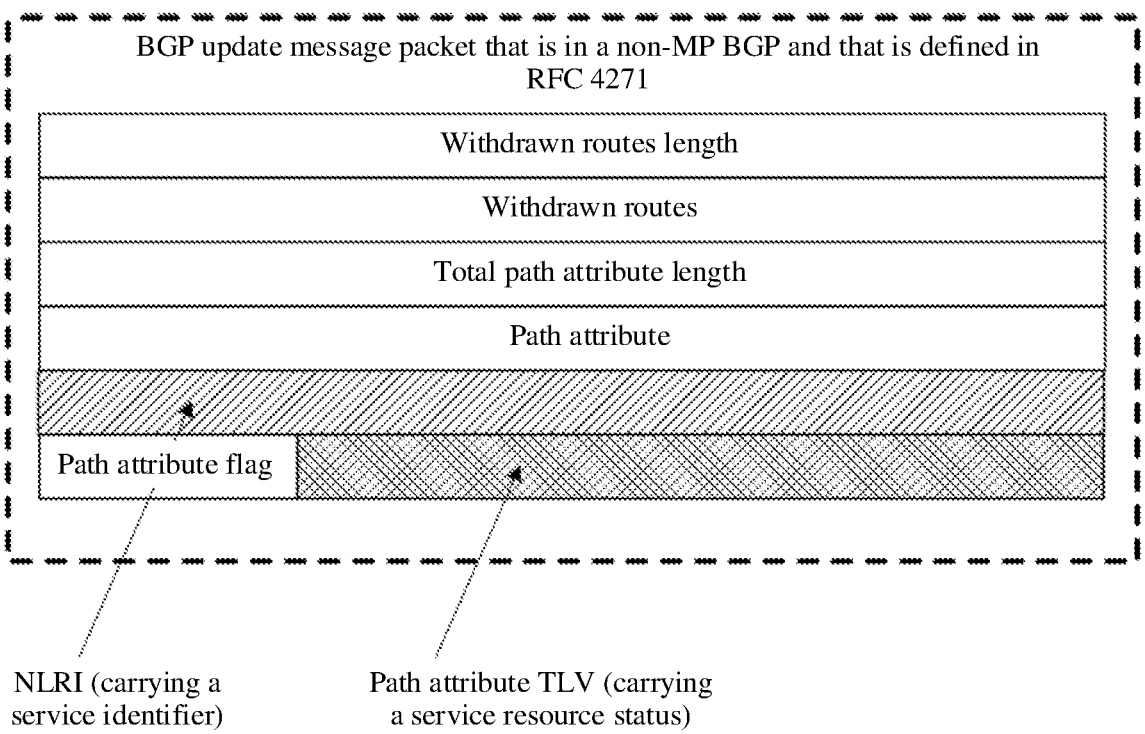
FIG. 9 is a schematic diagram of a format of a BGP update message packet that is in a non-MP BGP and that is defined in RFC 4271 according to an embodiment.

Currently, the BGP includes a multiprotocol (MP) BGP and a non-MP BGP. FIG. 9 is a schematic diagram of a format of a BGP update message packet that is in a non-MP BGP and that is defined in request for comments (RFC) 4271 according to an embodiment. As shown in FIG. 9, the BGP update message packet includes a withdrawn routes length field, a withdrawn routes field, a total path attribute length field, a path attribute field, an NLRI field, a path attribute flag field, and a path attribute TLV field.

In this case, an NLRI field in FIG. 9 may carry the service resource identifier of the service resource managed by the service node. The path attribute TLV in FIG. 9 carries the service resource status of the service resource managed by the service node.

The foregoing is only a possible extension manner of the BGP update message packet in the non-MP BGP. An extension manner of the BGP update message packet in the non-MP BGP is not limited in this embodiment, provided that a BGP update message packet that is in the non-MP BGP and that is obtained through extension can carry the service resource identifier of the service resource managed by the service node and the service resource status of the service resource managed by the service node.

In addition, in a non-MP BGP scenario, if a service node no longer manages a service resource, a service resource identifier of the service resource that is no longer managed may be carried in the withdrawn routes field in FIG. 9, to notify a forwarding node that the service node no longer manages the service resource indicated by the service resource identifier.

Figure 10:
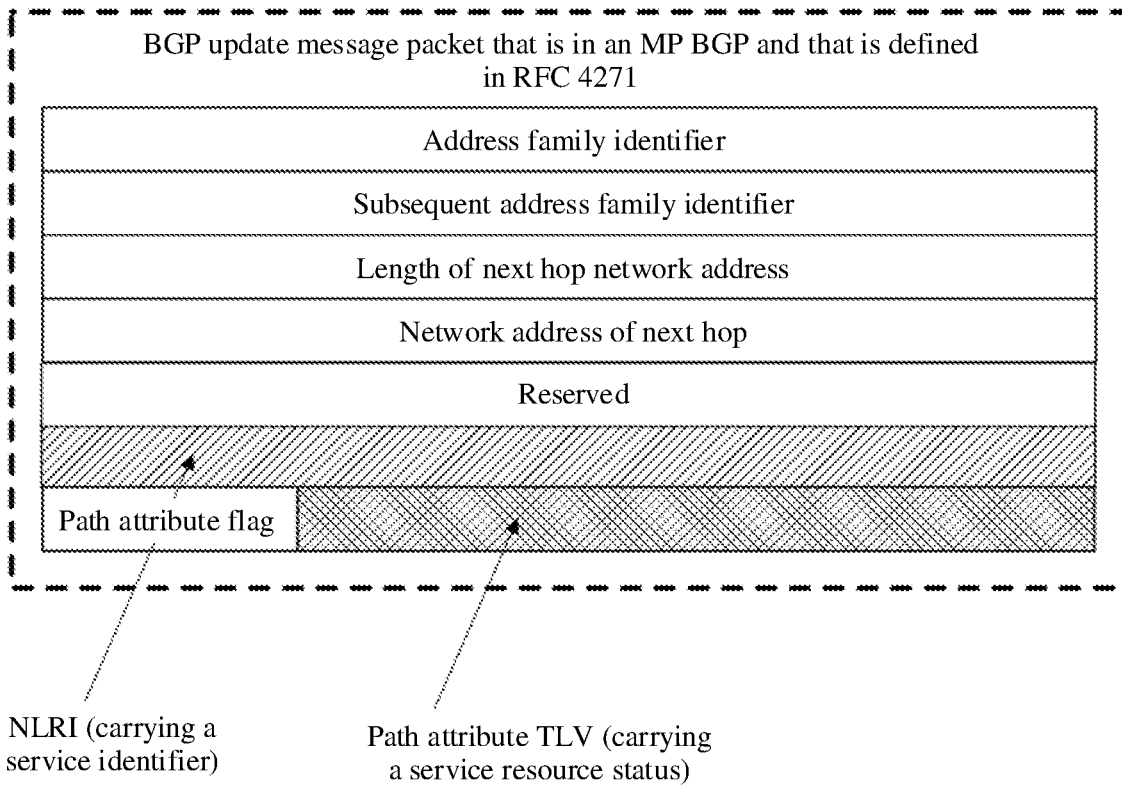
FIG. 10 is a schematic diagram of a format of a BGP update message packet that is in an MP BGP and that is defined in RFC 4271 according to an embodiment.

FIG. 10 is a schematic diagram of a format of a BGP update message packet that is in an MP BGP and that is defined in request for comments (RFC) 4271 according to an embodiment. As shown in FIG. 10, the BGP update message packet in the MP BGP includes an address family identifier field, a subsequent address family identifier field, a length of next hop network address field, a network address of next hop field, a reserved field, an NLRI field, a path attribute flag field, and a path attribute TLV field.

In this case, the NLRI field in FIG. 10 may carry the service resource identifier of the service resource managed by the service node. The path attribute TLV in FIG. 10 carries the service resource status of the service resource managed by the service node.

The foregoing is only a possible extension manner of the BGP update message packet in the MP BGP. An extension manner of the BGP update message packet in the MP BGP is not limited in this embodiment, provided that a BGP update message packet that is in the MP BGP and that is obtained through extension can carry the service resource identifier of the service resource managed by the service node and the service resource status of the service resource managed by the service node.

In addition, in an MP BGP scenario, if a service node no longer manages a service resource, a service resource identifier of the service resource that is no longer managed may be carried in MP non-reachability NLRI (MP_UNreach_NLRI) in a withdrawn routes field, to notify a forwarding node that the service node no longer manages the service resource indicated by the service resource identifier. A format of MP_UNreach_NLRI is not described in detail herein.

The foregoing describes how to extend existing notification packets in several protocols to obtain the advertisement packet provided in this embodiment. Optionally, a new packet may alternatively be defined in various protocols to represent the advertisement packet provided in this embodiment, provided that the redefined packet can carry the service resource identifier of the service resource managed by the service node and the service resource status of the service resource managed by the service node. Examples are not described one by one herein.

It should be noted that an anycast technology in a current related technology means communication between a transmitter and a nearest group of receivers in an IPv6 protocol. A definition of anycast in the related technology is as follows. When a unicast address is assigned to more than one interface, a forwarding node routes a packet destined for the interfaces to a "nearest" destination interface measured by a routing protocol.

The packet forwarding method provided in this embodiment may alternatively be applied to the foregoing anycast technology. In this case, it is equivalent to improving the anycast technology in the related technology. In the anycast technology in this embodiment, a terminal device is allowed to send a data packet to a target service node that is in a group of service nodes. The target service node is selected by a forwarding node that is in a routing system based on a service resource status advertised by each service node, where the service node is transparent to the terminal device.

When the packet forwarding method provided in this embodiment is applied to the foregoing improved anycast technology, a target service identifier carried in the packet sent by the terminal device is an anycast IP address.

Optionally, in this embodiment, the service identifier may alternatively be a service name or another symbol, other than an anycast address, that can uniquely identify a service, for example, may be a service identity (ID). Examples are not described one by one herein.

Figure 11:
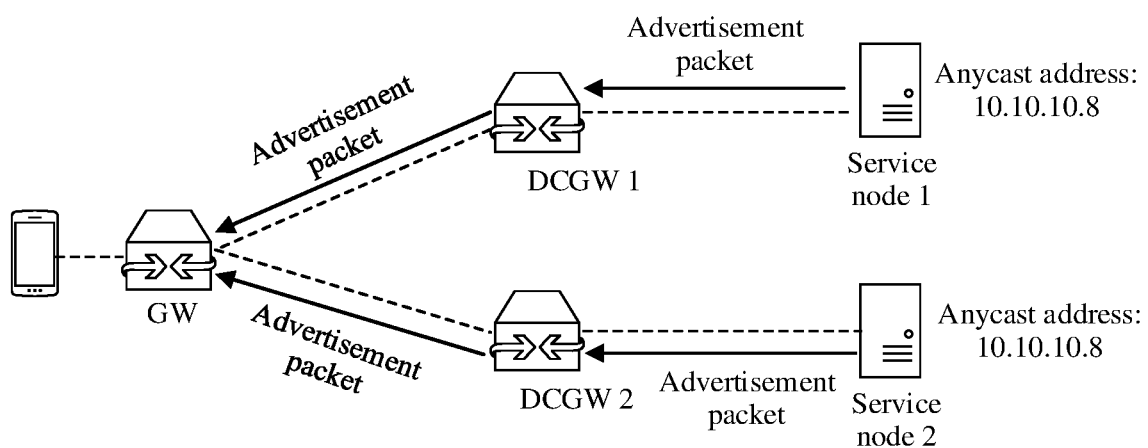
FIG. 11 is a schematic flowchart of advertising an advertisement packet by a service node according to an embodiment.

FIG. 11 is a schematic flowchart of advertising an advertisement packet by a service node according to an embodiment. As shown in FIG. 11, a network includes a gateway (GW), data center gateway (DCGW) 1, DCGW 2, service node 1, and service node 2. The GW is separately connected to DCGW 1 and DCGW 2, DCGW 1 is connected to service node 1, and DCGW 2 is connected to service node 2. The GW is a gateway on a terminal device side.

As shown in FIG. 11, service node 1 and service node 2 each manage a service resource corresponding to a service whose anycast address is 10.10.10.8. Therefore, service node 1 may use the anycast address 10.10.10.8 as a service resource identifier of the service resource corresponding to the service whose anycast address is 10.10.10.8, and then advertise a service resource status of service node 1 and the anycast address to the GW via DCGW 1. The service resource status advertised by service node 1 indicates a resource usage status of the service resource that corresponds to the service whose anycast address is 10.10.10.8 and that is managed by service node 1. Likewise, service node 2 may advertise a service resource status of service node 2 and the anycast address to the GW via DCGW 2. The service resource status advertised by service node 2 indicates a resource usage status of the service resource that corresponds to the service whose anycast address is 10.10.10.8 and that is managed by service node 2. In this way, the GW can sense the service resource statuses of service node 1 and service node 2.

In addition, as shown in FIG. 11, to enable service node 1 and service node 2 each to advertise an advertisement packet, speaker modules may be respectively deployed on service node 1 and service node 2. Service node 1 and service node 2 each can advertise the advertisement packet externally via the speaker module.

FIG. 11 is described by using an example in which the service node is a server corresponding to a service application installed on a terminal device. Optionally, in another implementation, in a centralized scheduling scenario of a service function chain, if a controller delivers a loose forwarding path, the loose forwarding path includes ordered SFs. It is assumed that a forwarding node is an SFF that manages a first SF instance corresponding to a first SF on the loose forwarding path or an ingress of an SFC domain, and service nodes are a plurality of SFFs that manage a second SF instance corresponding to a second SF on the loose forwarding path. When the forwarding node is the SFF that manages the first SF instance corresponding to the first SF on the loose forwarding path, the second SF is a next SF of the first SF on the loose forwarding path. When the forwarding node is the ingress of the SFC domain, the second SF is the first SF on the loose forwarding path.

In this scenario, each service node can advertise, to the forwarding node, an advertisement packet that indicates a service resource status of the managed second SF instance. In this way, the forwarding node can perform flexible scheduling based on the service resource status of each service node, to prevent a single SFF from being overloaded. For an implementation of how the service node advertises the advertisement packet that indicates the service resource status of the managed second SF instance, refer to the foregoing content. Details are not described herein again.

It should be noted that the foregoing embodiment is described by using an example in which the service node advertises the advertisement packet to the forwarding node. In this scenario, the advertisement packet indicates the forwarding node to select a target service node from a plurality of service nodes based on a service resource status advertised by each of the plurality of service nodes to forward a packet. Optionally, the service node may alternatively advertise the advertisement packet to the controller, where the advertisement packet carries a service resource status of a service resource managed by the service node, and the service resource status indicates a resource usage status of the service resource managed by an advertiser. In this scenario, the advertisement packet indicates the controller to advertise packet forwarding indication information to the forwarding node based on the service resource status advertised by the service node, where the forwarding indication information indicates, to the forwarding node, how to select a target service node from a plurality of service nodes to forward a packet.

For example, the forwarding indication information may be the service resource status advertised by the service node, so that the forwarding node selects, based on the service resource status advertised by the service node in the plurality of service nodes, the target service node from the plurality of service nodes to forward the packet. In this case, this is equivalent to that the forwarding node obtains, from the controller, the service resource status advertised by the service node.

For another example, the forwarding indication information may be a packet forwarding path. In this case, this is equivalent to that the controller selects, based on the service resource status advertised by the service node, the target service node from the plurality of service nodes to forward the packet. Therefore, the controller may determine the packet forwarding path. The example may be applied to the foregoing strict forwarding path scenario in the SFC technology. Details are not described herein again.

In conclusion, in this embodiment, the service node can advertise the service resource status of the managed service resource to the forwarding node, so that the forwarding node can sense the service resource status of the service node. Therefore, when selecting the target service node, the forwarding node may consider the service resource status of the service node, to avoid a case in which data pressure on a single service node is high.

The embodiment shown in FIG. 6 is used to explain how the forwarding node senses the service resource status of each service node. The following describes how the forwarding node forwards a data packet based on the service resource status advertised by each service node.

Figure 12:
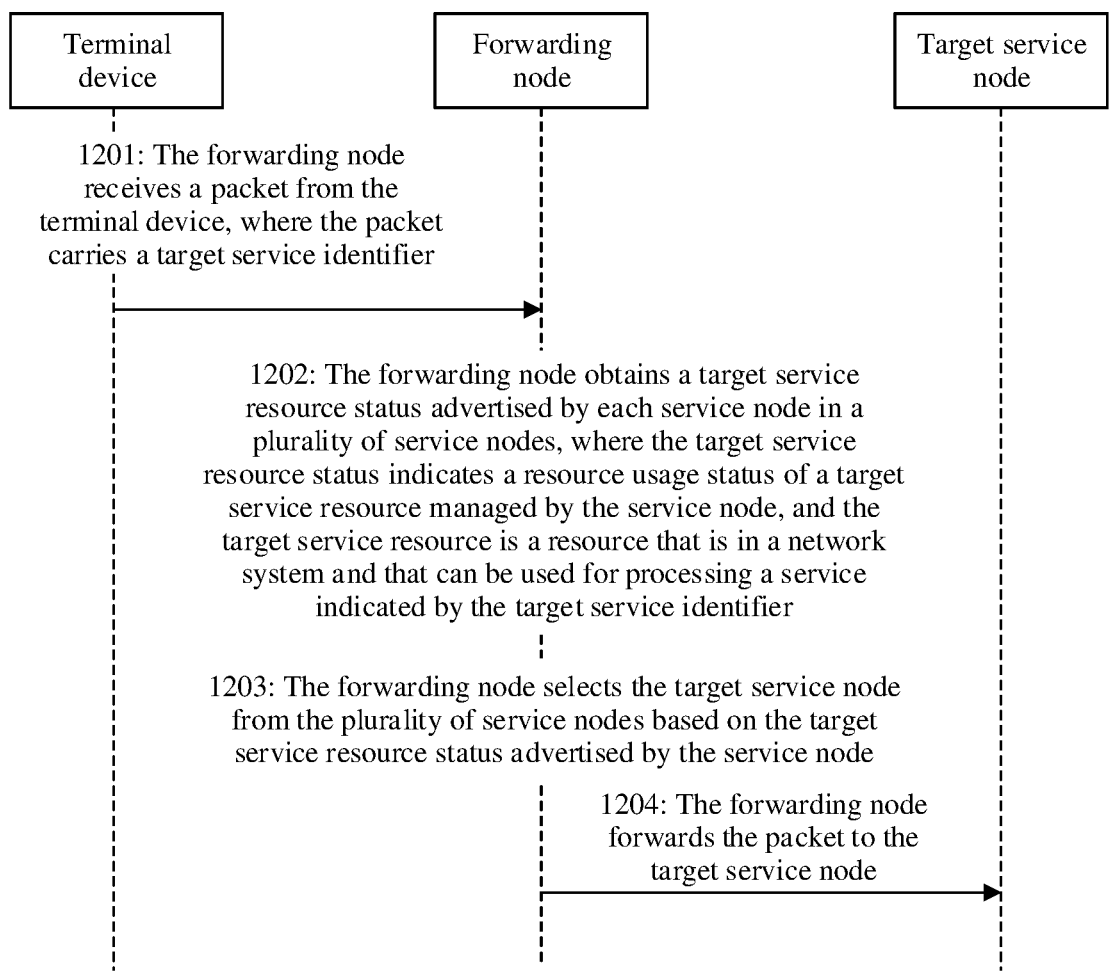
FIG. 12 is a flowchart of a packet forwarding method according to an embodiment.

FIG. 12 is a flowchart of a packet forwarding method according to an embodiment. As shown in FIG. 12, the method includes the following several steps.

Step 1201: A forwarding node receives a packet from a terminal device, where the packet carries a target service identifier.

The target service identifier carried in the packet indicates that service processing indicated by the target service identifier currently needs to be performed on the packet. It can be understood from the embodiment shown in FIG. 2 that the target service identifier may be an anycast address, or may be a service name, a symbol, other than the anycast address, that can uniquely identify a service, or the like.

Because a plurality of different service nodes may exist in a network and manage service resources that can provide the service indicated by the target service identifier, when receiving the data packet, the forwarding node needs to select one service node from the plurality of different service nodes to process the data packet.

For example, for the GW shown in FIG. 11, when the GW receives the data packet sent by the terminal device, the GW needs to determine whether service node 1 or service node 2 processes the data packet. A determining manner is described in detail in the following step 1202.

Step 1202: The forwarding node obtains a target service resource status advertised by each service node in the plurality of service nodes. The target service resource status indicates a resource usage status of a target service resource managed by the service node, and the target service resource is a resource that is in the network system and that can be used for processing the service indicated by the target service identifier.

It can be understood from the embodiment shown in FIG. 2 that the forwarding node can obtain, based on an advertisement packet advertised by each service node, a service resource status of a service resource managed by the service node. In this way, the forwarding node can store the service resource status of the service resource managed by the service node. Therefore, in an implementation, in step 1202, the forwarding node may obtain the target service resource status of the service node from the stored service resource status.

Optionally, in another implementation, if the service node advertises the advertisement packet to a control node in the network, the forwarding node may obtain the target service resource status of the service node from the control node. Details are not described herein.

In addition, it can be understood from the embodiment shown in FIG. 2 that the service resource status advertised by the service node may be a unified service resource status for all service resources managed by the service node. In this scenario, in step 1202, the forwarding node may directly use the service resource status advertised by each service node as the target service resource status advertised by the service node. Optionally, the service resource status advertised by the service node may be a service resource status of each service resource of all service resources managed by the service node. In this scenario, in step 1202, the forwarding node may obtain, from the service resource status of each service resource of all service resources managed by the service node, a service resource status that is advertised by the service node and that corresponds to the target service resource, to obtain the target service resource status of the service node.

Step 1203: The forwarding node selects a target service node from the plurality of service nodes based on the target service resource status advertised by the service node.

In an implementation, when the service resource status includes a light load state and an overload state, the forwarding node may select, from the plurality of service nodes, a service node whose target service resource status is the light load state as the target service node.

For example, in the network shown in FIG. 11, when the forwarding node receives the data packet, if the target service resource status of service node 1 is the overload state, the forwarding node determines service node 2 as the target service node. Optionally, if the target service resource status of service node 2 is the overload state, the forwarding node determines service node 1 as the target service node.

Optionally, if there are two or more service nodes whose target service resource status is the light load state in the plurality of service nodes, the forwarding node further needs to continue to select one service node as the target service node. Therefore, in an implementation, to reduce a transmission delay of the data packet and improve a service response speed for the data packet, the forwarding node may determine a service node priority based on network performance of each service node. Network performance of a service node with a higher priority is better. The network performance of the service node indicates network performance on a transmission path between the forwarding node and a corresponding service node. In this way, the target service node finally selected by the forwarding node is a service node with a highest priority among service nodes whose target service resource status is the light load state in the plurality of service nodes.

In this scenario, an implementation in which the forwarding node selects the target service node may be: sequentially viewing a target service resource status of each service node in descending order of priorities and determining a service node that is first viewed and whose target service resource status is the light load state as the target service node.

For example, there are three service nodes that manage service resources for processing the service indicated by the target service identifier in step 1201, and the three service nodes are respectively represented as service node 1, service node 2, and service node 3. Priorities of the three service nodes are sorted as follows. Service node 1>service node 2>service node 3. In addition, a target service resource status of service node 1 is the overload state, a target service resource status of service node 2 is the light load state, and a target service resource status of service node 3 is the light load state. In this case, the service node that is first viewed by the forwarding node in descending order of priorities and whose target service resource status is the light load state is service node 2. Therefore, the forwarding node uses service node 2 as the target service node.

In addition, the network performance of the service node includes one or more of a transmission delay on the transmission path between the forwarding node and the corresponding service node, a total metric of the transmission path between the forwarding node and the corresponding service node, and a remaining bandwidth of the transmission path between the forwarding node and the corresponding service node.

For example, for the plurality of service nodes that manage service resources for processing the service indicated by the target service identifier in step 1201, the total metric of the transmission path between the forwarding node and each service node is determined, and then the service nodes are sorted in ascending order of the total metrics, so that the service nodes sorted in descending order of priorities can be obtained. The total metrics of the transmission path between the forwarding node and each service node may be determined based on a forwarding entry on the forwarding node. Details are not described herein.

For another example, for the plurality of service nodes that manage service resources for processing the service indicated by the service identifier in step 1201, the transmission delay on the transmission path between the forwarding node and each service node is determined, and then the service nodes are sorted in ascending order of the transmission delays, so that the service nodes sorted in descending order of priorities can be obtained. The transmission delay on the transmission path between the forwarding node and each service node may be implemented based on an in-band flow measurement technology. Details are not described herein.

In addition, for a service node attached to the forwarding node, a priority of the service node may be directly set to the highest.

In addition, optionally, if there are two or more service nodes whose service resource statuses are the light load state in the plurality of service nodes, in another implementation, the forwarding node may select, based on a preset load balancing ratio, one service node from the service nodes whose service resource statuses are the light load state as the target service node. For example, in the network shown in FIG. 11, the GW determines that the service resource statuses of service node 1 and service node 2 are both the light load state. It is assumed that the preset load balancing ratio is service node 1:service node 2=2:3. In this case, the forwarding node selects a service node according to a principle that a selection probability of service node 1 is 40% and a selection probability of service node 2 is 60%. In this way, if the service resource statuses of the two service nodes are the light load state in a long time period, 40% traffic flows to service node 1 and 60% traffic flows to service node 2 in the time period.

In addition, when the service resource status is represented by using a value of resource usage, the forwarding node may set a usage threshold, and then determine, based on the usage threshold, a service node for processing the data packet. A implementation is not described in detail.

Step 1204: The forwarding node forwards the packet to the target service node.

After determining the target service node in step 1202, the forwarding node may forward the packet to the target service node. A process in which the forwarding node forwards the packet to the target service node is not described in detail herein.

In conclusion, in this embodiment, the forwarding node can sense a service resource status advertised by the service node, and the service resource status indicates a resource usage status of a service resource managed by the service node. The forwarding node can sense the service resource status advertised by the service node. Therefore, when selecting the target service node, the forwarding node may consider the service resource status of the service node, to avoid a case in which data pressure on a single service node is high.

The embodiment shown in FIG. 12 may be applied to the scenario shown in FIG. 2 or FIG. 3 or applied to the scenario of the loose forwarding path in the service function chain shown in FIG. 5. When the method provided in this embodiment is applied to a strict forwarding path scenario of a service function chain, a controller may obtain a service resource status that is of one or more service function instances (which is equivalent to a service resource) managed by each SFF (which is equivalent to a service node) and that is advertised by the SFF. The controller determines a strict forwarding path for the service function chain based on the service resource status that is of the one or more service function instances managed by the SFF and that is advertised by the SFF and advertises the strict forwarding path as the foregoing forwarding indication information to each node in an SFC domain. For any service function on any service function chain, for an implementation in which the controller selects, from the SFFs that manage the service function instances having the service function, one service function instance managed by the SFF to implement the service function, refer to the implementation of selecting the target service node in the embodiment in FIG. 12. Details are not described herein.

Figure 13:
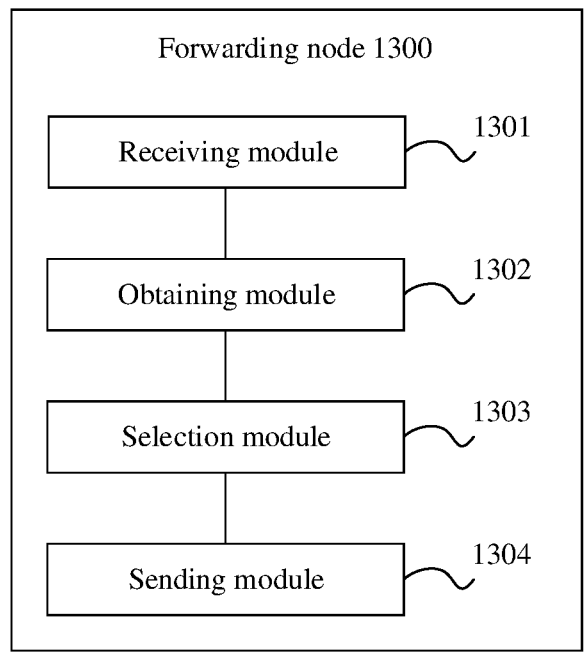
FIG. 13 is a schematic diagram of a structure of a forwarding node according to an embodiment.

FIG. 13 is a schematic diagram of a structure of a forwarding node according to an embodiment. As shown in FIG. 13, the forwarding node 1300 includes a receiving module 1301, an obtaining module 1302, a selection module 1303, and a sending module 1304.

The receiving module 1301 is configured to receive a packet from a terminal device, where the packet carries a target service identifier. For an implementation, refer to step 1201 in the embodiment in FIG. 12. Details are not described herein again.

The obtaining module 1302 is configured to obtain a target service resource status advertised by each service node in a plurality of service nodes, where the target service resource status indicates a resource usage status of a target service resource managed by the service node, and the target service resource is a resource that is in a network system and that can be used for processing a service indicated by the target service identifier. For an implementation, refer to step 1202 in the embodiment in FIG. 12. Details are not described herein again.

The selection module 1303 is configured to select a target service node from the plurality of service nodes based on the target service resource status advertised by the service node. For an implementation, refer to step 1203 in the embodiment in FIG. 12. Details are not described herein again.

The sending module 1304 is configured to forward the packet to the target service node. For an implementation, refer to step 1204 in the embodiment in FIG. 12. Details are not described herein again.

Optionally, the receiving module is further configured to: receive an advertisement packet sent by any service node in the network system, where the advertisement packet carries a service resource status of a service resource managed by the service node; and store the service resource status advertised by the service node.

The obtaining module is configured to:
  obtain the target service resource status of the service node from the stored service resource status.

Optionally, the advertisement packet further carries a service resource identifier of each service resource in one or more service resources managed by the service node, the service resource status corresponds to each service resource identifier, and the service resource status corresponding to the service resource identifier indicates a resource usage status of a service resource that is indicated by the corresponding service resource identifier and that is managed by the service node.

The obtaining module is configured to:
  obtain, from the stored service resource status, a service resource status that is advertised by the service node and that corresponds to the target service resource, to obtain the target service resource status of the service node.

Optionally, when the service node supports an open shortest path first (OSPF) protocol, the advertisement packet is an extended prefix type-length-value (TLV), and an address prefix of the extended prefix TLV carries the service resource identifier of the service resource managed by the service node, and an extended sub-TLV of the extended prefix TLV or a flag of the extended prefix TLV carries the service resource status of the service resource managed by the service node.

Optionally, when the service node supports an intermediate system to intermediate system (ISIS) protocol, the advertisement packet is an extended IP reachability type-length-value (TLV), a prefix of the extended IP reachability TLV carries the service resource identifier of the service resource managed by the service node, and a sub-TLV of the extended IP reachability TLV carries the service resource status of the service resource managed by the service node.

Optionally, when the service node supports a border gateway protocol (BGP), the advertisement packet is a BGP update message packet, network layer reachability information (NLRI) in the BGP update message packet carries the service resource identifier of the service resource managed by the service node, and a path attribute TLV in the BGP update message packet carries the service resource status of the service resource managed by the service node.

Optionally, the BGP includes a multiprotocol (MP) BGP and a non-MP BGP.

Optionally, the forwarding node further includes:

a determining module, configured to determine, by the forwarding node, a service node priority based on network performance of each service node, where network performance of a service node with a higher priority is better, and the network performance of the service node indicates network performance on a transmission path between the forwarding node and a corresponding service node.

The selection module is configured to:

determine the target service node based on the target service resource status of the service node and the service node priority.

Optionally, the target service resource status includes a light load state and an overload state, the overload state indicates that resource usage of a target service resource managed by the corresponding service node exceeds a first usage threshold, and the light load state indicates that resource usage of a target service resource managed by the corresponding service node is less than a second usage threshold.

Optionally, the network performance of the service node includes one or more of a transmission delay on the transmission path between the forwarding node and the corresponding service node, a total metric of the transmission path between the forwarding node and the corresponding service node, and a remaining bandwidth of the transmission path between the forwarding node and the corresponding service node.

Optionally, the forwarding node may be a gateway (GW) and the plurality of service nodes may be a plurality of servers communicating with the GW.

Optionally, the forwarding node may be a gateway (GW), the plurality of service nodes may be a plurality of server cluster master nodes communicating with the GW, each of the plurality of server cluster master nodes may be connected to the GW via a data center gateway (DCGW), and two of the plurality of server cluster master nodes may be located in different data centers.

Optionally, the target service identifier is an anycast IP address or a service name.

Optionally, the forwarding node may be an ingress node or a service function forwarder (SFF) in a service function chain (SFC) domain and the plurality of service nodes may be SF instances managed by a plurality of SFFs.

In conclusion, in this embodiment, the forwarding node can sense a service resource status of the service node, and the service resource status indicates a resource usage status of a service resource managed by the service node. The forwarding node can sense the service resource status of the service node. Therefore, when selecting the target service node, the forwarding node may consider the service resource status of the service node, to avoid a case in which data pressure on a single service node is high.

It should be noted that, when the forwarding node provided in the foregoing embodiment forwards the packet, division into the foregoing functional modules is merely used as an example for description. During actual application, the foregoing functions may be allocated to different functional modules for implementation based on a requirement. In other words, an internal structure of the forwarding node is divided into different functional modules, to implement all or a part of the functions described above. In addition, the forwarding node provided in the foregoing embodiment pertains to a same concept as the packet forwarding method embodiment. For an implementation process of the forwarding node, refer to the method embodiment. Details are not described herein again.

Figure 14:
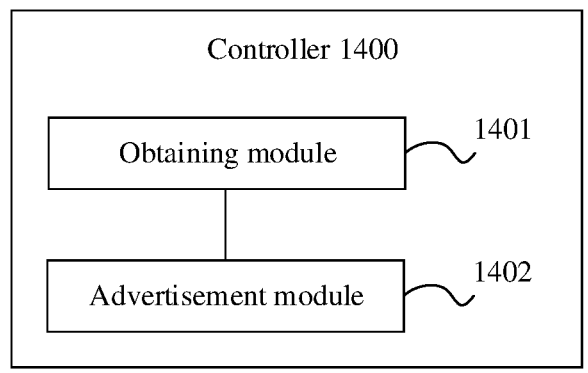
FIG. 14 is a schematic diagram of a structure of a controller according to an embodiment.

FIG. 14 is a schematic diagram of a structure of a controller according to an embodiment. The controller is a controller in a network system, and the network system further includes a plurality of service nodes. Any service node in the plurality of service nodes manages one or more service resources, and each service resource is for implementing a service function on a service function chain. As shown in FIG. 14, the controller 1400 includes an obtaining module 1401 and an advertisement module 1402.

The obtaining module 1401 is configured to obtain a service resource status advertised by each service node in the plurality of service nodes, where the service resource status indicates a resource usage status of a service resource managed by an advertiser. For an implementation, refer to the foregoing related content of the service function chain. Details are not described herein again.

The advertisement module 1402 is configured to advertise packet forwarding indication information to the forwarding node based on the service resource status advertised by the service node, where the forwarding indication information indicates, to the forwarding node, how to select a target service node from the plurality of service nodes to forward a packet. For an implementation, refer to the foregoing related content of the service function chain. Details are not described herein again.

Optionally, any service node in the plurality of service nodes manages one or more service resources, and each service resource in the one or more service resources is for implementing a service function on a service function chain.

The packet forwarding indication information is a forwarding path for the service function chain, and the forwarding path indicates a service resource of a service node on which a data packet is processed.

The method provided in this embodiment may be applied to a service function chain technology. In the service function chain technology, the controller specifies a forwarding path of a packet in a strict manner. In this case, for any service function on the service function chain, the controller may select, from the service nodes based on a service resource status of a service function instance of the service function managed by each service node, a service function instance managed by a service node to implement the service function, to determine a strict forwarding path for the service function chain. The strict forwarding path specifies a service function instance of a service node for processing a packet. The service function instance herein is equivalent to the service resource managed by the service node, and the service node may be a service function forwarder in the service function chain technology. In this way, a problem that data processing pressure on a single service node is high can be avoided, to improve quality of a service provided by the service node for a terminal device.

It should be noted that, when the controller provided in the foregoing embodiment determines the forwarding path, division into the foregoing functional modules is merely used as an example for description. During actual application, the foregoing functions may be allocated to different functional modules for implementation based on a requirement. In other words, an internal structure of the controller is divided into different functional modules, to implement all or a part of the functions described above. In addition, the controller provided in the foregoing embodiment pertains to a same concept as the forwarding path determining method embodiment. For an implementation process of the controller, refer to the method embodiment. Details are not described herein again.

Figure 15:
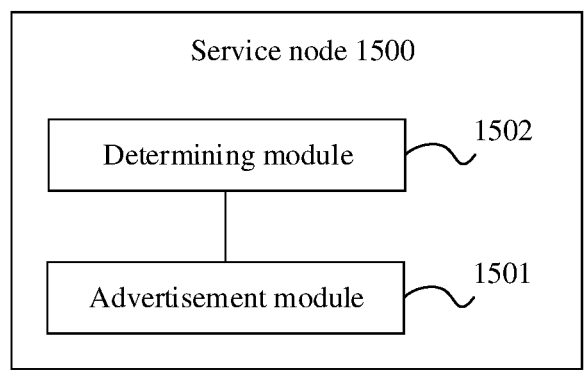
FIG. 15 is a schematic diagram of a structure of a service node according to an embodiment.

FIG. 15 is a schematic diagram of a structure of a service node according to an embodiment. The service node is any one of a plurality of service nodes included in a network system, and the network system further includes a forwarding node or a controller. As shown in FIG. 15, the service node 1500 includes:

an advertisement module 1501, configured to advertise an advertisement packet to the forwarding node or the controller, where the advertisement packet carries a service resource status of a service resource managed by the service node, and the service resource status indicates a resource usage status of the service resource managed by an advertiser. For an implementation, refer to step 602 in the embodiment in FIG. 6. Details are not described herein again.

The advertisement packet indicates the forwarding node to select, based on the service resource status advertised by each service node in the plurality of service nodes, a target service node from the plurality of service nodes to forward a packet; or the advertisement packet indicates the controller to advertise packet forwarding indication information to the forwarding node based on the service resource status advertised by each service node, where the forwarding indication information indicates, to the forwarding node, how to select a target service node from the plurality of service nodes to forward a packet.

Optionally, the advertisement packet further carries a service resource identifier of each service resource in one or more service resources managed by the service node, the service resource status of the service node corresponds to each service resource identifier, and the service resource status corresponding to the service resource identifier indicates a resource usage status of a service resource that is indicated by the corresponding service resource identifier and that is managed by the service node.

Optionally, when the service node supports an open shortest path first (OSPF) protocol, the advertisement packet is an extended prefix type-length-value (TLV), and an address prefix of the extended prefix TLV carries the service resource identifier of the service resource managed by the service node, and an extended sub-TLV of the extended prefix TLV or a flag of the extended prefix TLV carries the service resource status of the service resource managed by the service node.

Optionally, when the service node supports an intermediate system to intermediate system (ISIS) protocol, the advertisement packet is an extended IP reachability type-length-value (TLV), a prefix of the extended IP reachability TLV carries the service resource identifier of the service resource managed by the service node, and a sub-TLV of the extended IP reachability TLV carries the service resource status of the service resource managed by the service node.

Optionally, when the service node supports a border gateway protocol (BGP), the advertisement packet is a BGP update message packet, network layer reachability information (NLRI) in the BGP update message packet carries the service resource identifier of the service resource managed by the service node, and a path attribute TLV in the BGP update message packet carries the service resource status of the service resource managed by the service node.

Optionally, the BGP includes a multiprotocol (MP) BGP and a non-MP BGP.

Optionally, as shown in FIG. 15, the service node 1500 further includes:

a determining module 1502, configured to determine, by the service node, a service resource status at a current time point. For an implementation, refer to step 601 in the embodiment in FIG. 6. Details are not described herein again.

The advertisement module 1501 is configured to: if the service resource status at the current time point is different from a service resource status prior to the current time point, perform an advertisement packet advertising operation.

Optionally, the service resource status includes a light load state and an overload state, the overload state indicates that resource usage of a service resource managed by a corresponding service node exceeds a first usage threshold, and the light load state indicates that resource usage of a service resource managed by a corresponding service node is less than a second usage threshold.

Optionally, the forwarding node may be a gateway (GW) and the plurality of service nodes may be a plurality of servers communicating with the GW.

Optionally, the forwarding node may be a gateway (GW), the plurality of service nodes may be a plurality of server cluster master nodes communicating with the GW, each of the plurality of server cluster master nodes may be connected to the GW via a data center gateway (DCGW), and two of the plurality of server cluster master nodes may be located in different data centers.

Optionally, the forwarding node may be an ingress node or a service function forwarder (SFF) in a service function chain (SFC) domain and the plurality of service nodes may be service function (SF) instances managed by a plurality of SFFs.

In conclusion, in this embodiment, the forwarding node can sense a service resource status of the service node, and the service resource status indicates a resource usage status of the service node. The forwarding node can sense the service resource status of the service node. Therefore, when selecting the target service node, the forwarding node may consider the service resource status of the service node, to avoid a case in which data pressure on a single service node is high.

It should be noted that, when the service node provided in the foregoing embodiment advertises the advertisement packet, division into the foregoing functional modules is merely used as an example for description. During actual application, the foregoing functions may be allocated to different functional modules for implementation based on a requirement. In other words, an internal structure of the service node is divided into different functional modules, to implement all or a part of the functions described above. In addition, the service node provided in the foregoing embodiment pertains to a same concept as the advertisement packet advertising method embodiment. For an implementation process of the service node, refer to the method embodiment. Details are not described herein again.

Figure 16:
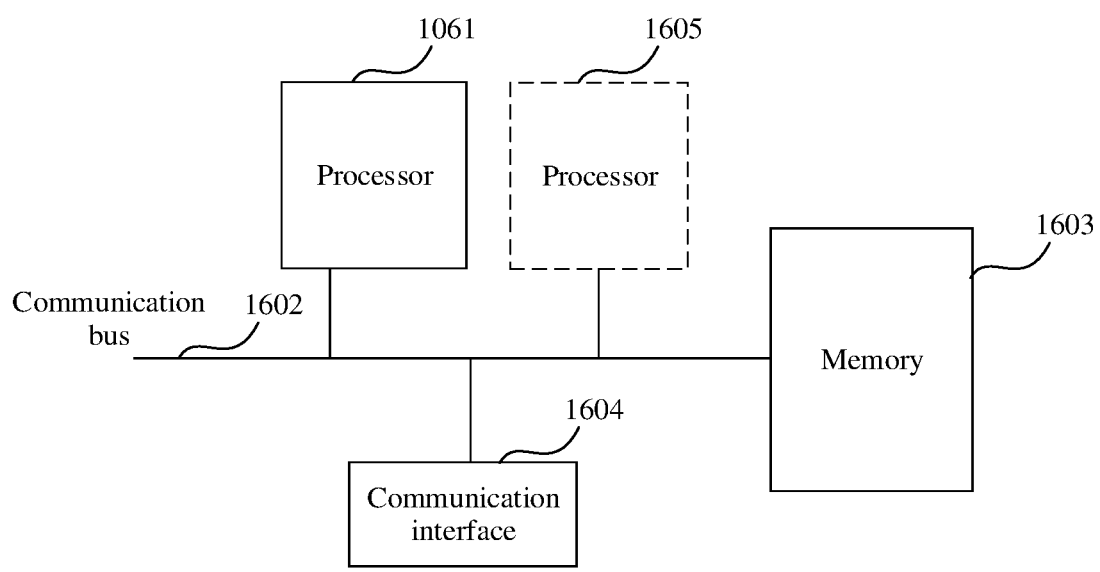
FIG. 16 is a schematic diagram of a structure of a network device according to an embodiment.

FIG. 16 is a schematic diagram of a structure of a network device according to an embodiment. The forwarding node, the service node, the controller, and the like in the foregoing embodiments may all be implemented by the network device shown in FIG. 16. The network device includes at least one processor 1601, a communication bus 1602, a memory 1603, and at least one communication interface 1604.

The processor 1601 may be a general-purpose central processing unit (CPU), an application-specific integrated circuit (ASIC), or one or more integrated circuits configured to control program execution.

For example, when the network device is the forwarding node in the foregoing embodiments, the processor 1601 is configured to select, based on a target service resource status advertised by each service node, a target service node configured to send a packet. For an implementation, refer to step 1202 and step 1203 in the embodiment in FIG. 12. When the network device is the controller in the foregoing embodiments, the processor 1601 is configured to determine a strict forwarding path for a service function chain based on a service resource status advertised by each service node. For an implementation, refer to the descriptions of the service function chain in the foregoing network system architecture. When the network device is the service node in the foregoing embodiments, the processor 1601 is configured to determine a service resource status. For an implementation, refer to step 601 in the embodiment in FIG. 6.

The communication bus 1602 may include a path, to transmit information between the foregoing components.

The memory 1603 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM), another compact disc storage, an optical disc storage (including a compact disc, a laser disc, an optical disc, a digital versatile disc, a Blu-ray disc, and the like), a magnetic disk, another magnetic storage device, or any other non-transitory medium that can be used to carry or store expected program code in a form of an instruction or a data structure and that can be accessed by a computer. However, the memory is not limited thereto. The memory 1603 may exist independently and is connected to the processor 1601 through the communication bus 1602. Alternatively, the memory 1603 may be integrated with the processor 1601.

The memory 1603 is configured to store program code and the processor 1601 is configured to control the execution. The processor 1601 is configured to execute the program code stored in the memory 1603. The program code may include one or more software modules. The forwarding node, the service node, and the control node in the foregoing embodiments may determine, via the processor 1601 and the one or more software modules in the program code in the memory 1603, data used for developing an application.

The communication interface 1604 is any apparatus such as a transceiver, and is configured to communicate with another device or communication network, for example, the Ethernet, a radio access network (RAN), and a wireless local area network (WLAN).

For example, when the network device is the forwarding node in the foregoing embodiments, the communication interface 1604 is configured to receive a service resource status advertised by each service node and is further configured to receive a packet from a terminal device and send the packet to a selected target service node. When the network device is the controller in the foregoing embodiments, the communication interface 1604 is configured to receive a service resource status advertised by each service node and send a determined forwarding path to a network ingress node. When the network device is the service node in the foregoing embodiments, the communication interface 1604 is configured to advertise an advertisement packet that carries a service resource status.

During implementation, in an embodiment, the network device may include a plurality of processors, for example, the processor 1601 and a processor 1605 in FIG. 16. Each of the processors may be a single-core processor or a multi-core processor. The processor herein may be one or more devices, circuits, and/or processing cores configured to process data (for example, computer program instructions).

The foregoing network device may be a general-purpose network device or a dedicated network device. During implementation, the network device may be a communication device or an embedded device such as a desktop computer, a portable computer, a network server, a palmtop computer (PDA), a mobile phone, a tablet computer, a wireless terminal device, a router, or a switch. A type of the network device is not limited in this embodiment.

All or a part of the foregoing embodiments may be implemented by software, hardware, firmware, or any combination thereof. When software is used to implement embodiments, all or a part of the embodiments may be implemented in a form of a computer program product. The computer program product includes one or more computer instructions. When the computer instructions are loaded and executed on the computer, the procedure or functions according to embodiments are all or partially generated. The computer may be a general-purpose computer, a dedicated computer, a computer network, or another programmable apparatus. The computer instructions may be stored in a non-transitory computer-readable storage medium or may be transmitted from a non-transitory computer-readable storage medium to another non-transitory computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The non-transitory computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person of ordinary skill in the art may understand that all or a part of the steps of embodiments may be implemented by hardware or a program instructing related hardware. The program may be stored in a non-transitory computer-readable storage medium, which may be a read-only memory, a magnetic disk, an optical disc, or the like.

The foregoing descriptions are merely embodiments but are not intended as limiting. Any modification, equivalent replacement, or improvement made without departing from the spirit and principle should fall within the scope of the embodiments.

What is claimed is:

1. A packet forwarding method, applied to a network system, wherein the network system comprises a forwarding node and a plurality of service nodes, the packet forwarding method comprising:

receiving, by the forwarding node, a packet from a terminal device, wherein the packet carries a target service identifier;

obtaining, by the forwarding node, a target service resource status advertised by each service node in the plurality of service nodes, wherein the target service resource status indicates a resource usage status of a target service resource managed by the service node, and the target service resource is a resource that is in the network system and that can be used for processing a service indicated by the target service identifier;

selecting, by the forwarding node, a target service node from the plurality of service nodes based on the target service resource status advertised by the service node; and forwarding, by the forwarding node, the packet to the target service node;

when the service node supports an open shortest path first (OSPF) protocol, the advertisement packet is an extended prefix type-length-value (TLV) forwarding indication information advertising.

2. The packet forwarding method according to claim 1, wherein before receiving, by the forwarding node, the packet from the terminal device, the packet forwarding method further comprises:

receiving, by the forwarding node, an advertisement packet sent by any service node in the network system, wherein the advertisement packet carries a service resource status of a service resource managed by the service node; and storing, by the forwarding node, the service resource status advertised by the service node; and obtaining, by the forwarding node, the target service resource status advertised by each service node in the plurality of service nodes further comprises:

obtaining, by the forwarding node, the target service resource status of the service node from the stored service resource status.

3. The packet forwarding method according to claim 2, wherein the advertisement packet further carries a service resource identifier of each service resource in one or more service resources managed by the service node, the service resource status corresponds to each service resource identifier, and the service resource status corresponding to the service resource identifier indicates a resource usage status of a service resource that is indicated by the corresponding service resource identifier and that is managed by the service node; and obtaining the target service resource status of the service node from the stored service resource status further comprises:

obtaining, from the stored service resource status, a service resource status that is advertised by the service node and that corresponds to the target service resource, to obtain the target service resource status of the service node.

4. The packet forwarding method according to claim 2, wherein, an address prefix of the extended prefix TLV carries the service resource identifier of the service resource managed by the service node, and an extended sub-TLV of the extended prefix TLV.

5. The packet forwarding method according to claim 2, wherein, when the service node supports an intermediate system to intermediate system (ISIS) protocol, the advertisement packet is an extended IP reachability type-length-value (TLV), a prefix of the extended IP reachability TLV carries the service resource identifier of the service resource managed by the service node, and a sub-TLV of the extended IP reachability TLV carries the service resource status of the service resource managed by the service node.

6. The packet forwarding method according to claim 2, wherein, when the service node supports a border gateway protocol (BGP), the advertisement packet is a BGP update message packet, network layer reachability information (NLRI) in the BGP update message packet carries the service resource identifier of the service resource managed by the service node, and a path attribute TLV in the BGP update message packet carries the service resource status of the service resource managed by the service node.

7. The packet forwarding method according to claim 6, wherein the BGP comprises a multiprotocol (MP) BGP and a non-MP BGP.

8. The packet forwarding method of claim 2, wherein a flag of the extended prefix TLV carries the service resource status of the service resource managed by the service node.

9. The packet forwarding method according to claim 1, wherein before selecting, by the forwarding node, the target service node from the plurality of service nodes based on the target service resource status advertised by the service node, the packet forwarding method further comprises:

determining, by the forwarding node, a service node priority based on network performance of each service node, wherein network performance of a service node with a higher priority is better, and the network performance of the service node indicates network performance on a transmission path between the forwarding node and a corresponding service node; and selecting the target service node from the plurality of service nodes based on the target service resource status advertised by the service node further comprises:

determining the target service node based on the target service resource status of the service node and the service node priority.

10. The packet forwarding method according to claim 9, wherein the network performance of the service node comprises:

a transmission delay on the transmission path between the forwarding node and the corresponding service node.

11. The packet forwarding method of claim 9, wherein the network performance of the service node comprises:

a total metric of the transmission path between the forwarding node and the corresponding service node.

12. The packet forwarding method of claim 9, wherein the network performance of the service node comprises:

a remaining bandwidth of the transmission path between the forwarding node and the corresponding service node.

13. The packet forwarding method according to claim 1, wherein the target service resource status comprises a light load state and an overload state, the overload state indicates that resource usage of a target service resource managed by the corresponding service node exceeds a first usage threshold, and the light load state indicates that resource usage of a target service resource managed by the corresponding service node is less than a second usage threshold.

14. The packet forwarding method according to claim 1, wherein the forwarding node is a gateway (GW), and the plurality of service nodes are a plurality of servers communicating with the GW.

15. The packet forwarding method according to claim 14, wherein the target service identifier is an anycast IP address.

16. The packet forwarding method of claim 14, wherein the target service identifier is a service name.

17. The packet forwarding method according to claim 1, wherein the forwarding node is a gateway GW, the plurality of service nodes are a plurality of server cluster master nodes communicating with the GW, each of the plurality of server cluster master nodes is connected to the GW via a data center gateway (DCGW), and two of the plurality of server cluster master nodes are located in different data centers.

* * * * *